(12) United States Patent
Ito

(10) Patent No.: US 7,466,863 B2
(45) Date of Patent: Dec. 16, 2008

(54) IMAGE ENCODING APPARATUS AND METHOD, COMPUTER PROGRAM, COMPUTER-READABLE STORAGE MEDIUM, AND IMAGE FORMING APPARATUS

(75) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 11/193,510

(22) Filed: Aug. 1, 2005

(65) Prior Publication Data

US 2006/0023957 A1 Feb. 2, 2006

(30) Foreign Application Priority Data

Aug. 2, 2004 (JP) ............................. 2004-225816

(51) Int. Cl.
*G06K 9/36* (2006.01)
(52) U.S. Cl. .................................................... 382/232
(58) Field of Classification Search ......... 382/232–233, 382/235–236, 238–239, 244, 247; 348/384.1, 348/387.1, 390.1; 375/240; 358/426.02–426.03, 358/426.06–426.07, 426.11
See application file for complete search history.

(56) References Cited

U.S. PATENT DOCUMENTS

| | | | | |
|---|---|---|---|---|
| 5,402,248 A | 3/1995 | Sato et al. | ................... | 358/426 |
| 5,701,367 A | 12/1997 | Koshi et al. | ................. | 382/239 |
| 5,889,596 A | 3/1999 | Yaguchi et al. | ............. | 358/448 |
| 5,945,930 A | 8/1999 | Kajiwara | ..................... | 341/50 |
| 5,960,116 A | 9/1999 | Kajiwara | .................... | 382/238 |
| 6,031,938 A | 2/2000 | Kajiwara | .................... | 382/239 |
| 6,067,382 A | 5/2000 | Maeda | ........................ | 382/239 |
| 6,094,510 A | 7/2000 | Yaguchi et al. | ............. | 382/232 |
| 6,097,364 A | 8/2000 | Miyamoto et al. | ............ | 345/97 |
| 6,101,282 A | 8/2000 | Hirabayashi et al. | ........ | 382/246 |
| 6,233,355 B1 | 5/2001 | Kajiwara | ..................... | 382/246 |
| 6,266,449 B1 | 7/2001 | Ohsawa | ...................... | 382/239 |
| 6,310,980 B1 | 10/2001 | Kajiwara | .................... | 382/238 |

(Continued)

FOREIGN PATENT DOCUMENTS

JP 07-123273 5/1995

(Continued)

*Primary Examiner*—Jose L Couso
(74) *Attorney, Agent, or Firm*—Fitzpatrick, Cella, Harper & Scinto

(57) ABSTRACT

According to this invention, the encoded data amount of an image and its area attribute information can be encoded to a target amount or less by one input operation of image data, and an input image can be efficiently encoded in accordance with the property of the image. For this purpose, an encoding sequence unit sets an initial quantization matrix table for an image encoding unit in accordance with a mode set by a mode setting unit, and sets parameters associated with attribute rewrite for an attribute rewrite unit. When an image is input, encoded image data generated by the image encoding unit is stored in a memory. Attribute-encoded data generated by an attribute encoding unit is also stored in the memory. The first counter counts an encoded-image data amount, and the second counter counts an attribute-encoded data amount. When the sum of these encoded data exceeds a target amount, the encoding sequence control unit updates the quantization matrix table for the image encoding unit, and causes the image encoding unit to continue encoding. The updated quantization matrix table is set for a re-encoding unit, and encoded data stored in the memory is re-encoded.

12 Claims, 21 Drawing Sheets

U.S. PATENT DOCUMENTS

| | | | |
|---|---|---|---|
| 6,501,859 B1 | 12/2002 | Kajiwara | 382/239 |
| 6,549,676 B1 | 4/2003 | Nakayama et al. | 382/246 |
| 6,560,365 B1 | 5/2003 | Nakayama | 382/233 |
| 6,665,444 B1 | 12/2003 | Kajiwara | 382/240 |
| 6,711,295 B2 | 3/2004 | Nakayama et al. | 382/232 |
| 6,768,819 B2 | 7/2004 | Yamazaki et al. | 382/240 |
| 6,847,735 B2 | 1/2005 | Kajiwara et al. | 382/233 |
| 6,879,726 B2 | 4/2005 | Sato et al. | 382/239 |
| 6,879,727 B2 | 4/2005 | Sato et al. | 382/239 |
| 6,917,716 B2 | 7/2005 | Kajiwara et al. | 382/240 |
| 6,947,600 B1 | 9/2005 | Sato et al. | 382/233 |
| 6,985,630 B2 | 1/2006 | Kajiwara | 382/233 |
| 7,013,050 B2 | 3/2006 | Kajiwara | 382/240 |
| 7,106,911 B2 | 9/2006 | Ohta et al. | 382/251 |
| 7,194,140 B2 * | 3/2007 | Ito et al. | 382/251 |
| 7,227,998 B2 | 6/2007 | Nakayama et al. | 382/232 |
| 2003/0002743 A1 | 1/2003 | Ohta et al. | 382/239 |
| 2003/0031371 A1 | 2/2003 | Kato et al. | 382/239 |
| 2003/0043905 A1 | 3/2003 | Nakayama et al. | 375/240.04 |
| 2003/0063811 A1 | 4/2003 | Kajiwara | 382/240 |
| 2003/0086127 A1 | 5/2003 | Ito et al. | 358/462 |
| 2003/0086597 A1 | 5/2003 | Ohta et al. | 382/131 |
| 2003/0118240 A1 | 6/2003 | Satoh et al. | 382/239 |
| 2003/0164975 A1 | 9/2003 | Aoyagi et al. | 358/1.15 |
| 2003/0169934 A1 | 9/2003 | Naito | 382/239 |
| 2003/0194138 A1 | 10/2003 | Osawa et al. | 382/233 |
| 2003/0202582 A1 | 10/2003 | Satoh | 375/240.03 |
| 2003/0228063 A1 | 12/2003 | Nakayama et al. | 382/251 |
| 2004/0013312 A1 | 1/2004 | Kajiwara | 382/240 |
| 2004/0213347 A1 | 10/2004 | Kajiwara et al. | 375/240.11 |
| 2005/0100226 A1 | 5/2005 | Kajiwara et al. | 382/232 |
| 2005/0249283 A1 | 11/2005 | Kajiwara et al. | 375/240.12 |
| 2006/0023957 A1 | 2/2006 | Ito | 382/232 |
| 2006/0045362 A1 | 3/2006 | Ito et al. | 382/232 |

FOREIGN PATENT DOCUMENTS

| | | |
|---|---|---|
| JP | 10-224640 | 8/1998 |
| JP | 2003-008903 | 1/2003 |
| JP | 2003-209698 | 7/2003 |

* cited by examiner

F I G. 21

| PROCESS MODE | INITIAL QUANTIZATION MATRIX | ATTRIBUTE REWRITE CONTENTS |
|---|---|---|
| AUTO | Q0 | ATTRIBUTE REWRITE CONTENTS |
| PHOTOGRAPH MODE | Q1 | ATTRIBUTE IS REWRITTEN INTO "HALFTONE" |
| CHARACTER-LINE IMAGE MODE | Q0 | ATTRIBUTE IS REWRITTEN INTO "CHARACTER-LINE IMAGE" |

IMAGE ENCODING APPARATUS AND METHOD, COMPUTER PROGRAM, COMPUTER-READABLE STORAGE MEDIUM, AND IMAGE FORMING APPARATUS

FIELD OF THE INVENTION

The present invention relates to an image data compression encoding technique.

BACKGROUND OF THE INVENTION

Conventionally, still image data is often compressed by a method using discrete cosine transform or a method using Wavelet transform. Encoding of this type is variable-length encoding, and hence the code amount changes for each image to be encoded.

According to JPEG encoding as an internal standardization scheme, only one quantization matrix can be defined for an image, and it is difficult to make image data fall within a target code amount without prescan. When JPEG encoding is used in a system which stores data in a limited memory, a memory overflow may occur.

In order to prevent this, conventional schemes used, for example, a method of re-reading a document upon changing the compression ratio parameter when the actual code amount exceeds an expected code amount, or a method of estimating a code amount in advance by prescan and re-setting quantization parameters to adjust the code amount.

As described above, prescan and actual scan are generally executed, but a document must be read at least two times at poor efficiency.

The assignee of the present applicant has proposed a technique of eliminating these two, prescan and actual scan operations and compressing data into a target code amount (e.g., Japanese Patent Laid-Open No. 2003-8903). According to this technique, encoded data is stored in two memories during one image input operation. When a generated code amount reaches a predetermined size, data in one memory is discarded, a parameter for increasing the compression ratio is set, and encoding continues. At this time, encoded data before the compression ratio is increased is stored in the other memory, and re-encoded in accordance with the updated parameter. This process is repeated every time the encoded data amount reaches a predetermined amount.

As a development of the above technique, the present application has also proposed a technique of determining whether area information of an image is, e.g., a character-line image area or halftone area, and switching the quantization matrix in accordance with the determination result in order to reduce degradation of the image quality based on compressed data (e.g., Japanese Patent Laid-Open No. 2003-209698).

According to these references, input of an image can be completed at once, and an encoded data amount generated at the same time can be adjusted to a target value or less.

However, a compression process corresponding to area information of an image does not always provide a high-quality decoded image based on the compression-encoded result. This is because area determination is not always correct. Further, when a normal document deteriorates over time or becomes dirty and loses its contrast, the document may be mistaken as a photo or the like.

SUMMARY OF THE INVENTION

The present invention has been made in consideration of the above situation, and has as its object to provide a technique of efficiently encoding an input image in accordance with its property while generating encoded data of a target code amount or less by one image input operation.

In order to solve the conventional problems, an image encoding apparatus according to the present invention has, for example, the following arrangement.

That is, there is provided an image encoding apparatus which receives image data, and encodes and outputs the image data and area information, comprising:

input mode setting means for setting whether input image data is a character-line image or a halftone image;

image encoding means for encoding image data in accordance with a first parameter for determining a compression ratio;

re-encoding means for decoding encoded data generated by the image encoding means, and re-encoding the decoded data in accordance with a second parameter for determining a compression ratio;

attribute detection means for detecting area attribute information of input image data;

attribute correction means for correcting the area attribute information in accordance with a third parameter;

attribute encoding means for encoding the area attribute information corrected by the attribute correction means;

initial parameter setting means for determining the first parameter and the third parameter in accordance with an input mode set by the input mode setting means, and respectively setting the first parameter and the third parameter for the image encoding means and the correction means;

monitoring means for monitoring a total code amount as a sum of an image-encoded data amount generated by the image encoding means and an attribute-encoded data amount generated by the attribute encoding means in accordance with the set parameters during input of a 1-page image, and determining whether the total code amount is not less than a predetermined value;

parameter update means for, when the monitoring means determines that the total code amount is not less than the predetermined value, (a) updating the first parameter set for the image encoding means to a new first parameter of a higher compression ratio, and causing the image encoding means to continue encoding of image data, and (b) setting a second parameter equal to the updated new first parameter for the re-encoding means, and causing the re-encoding means to re-encode image-encoded data before the total code amount is not less than the predetermined value; and control means for, when the parameter update means updates the parameters, (a) causing the re-encoding means to re-encode, in accordance with the second parameter, encoded data generated by the image encoding means before the new first parameter is set, and storing the re-encoded data as encoded data generated by the image encoding means after the new first parameter is set, and (b) storing the encoded data generated by the image encoding means after the new first parameter is set as succeeding encoded data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 21 is a table showing an example of an initial setting table.

DETAILED DESCRIPTION OF THE PREFERRED EMBODIMENTS

Preferred embodiments of the present invention will be described in detail below with reference to the accompanying drawings.

<Description of Outline of Apparatus>

Figure 20:
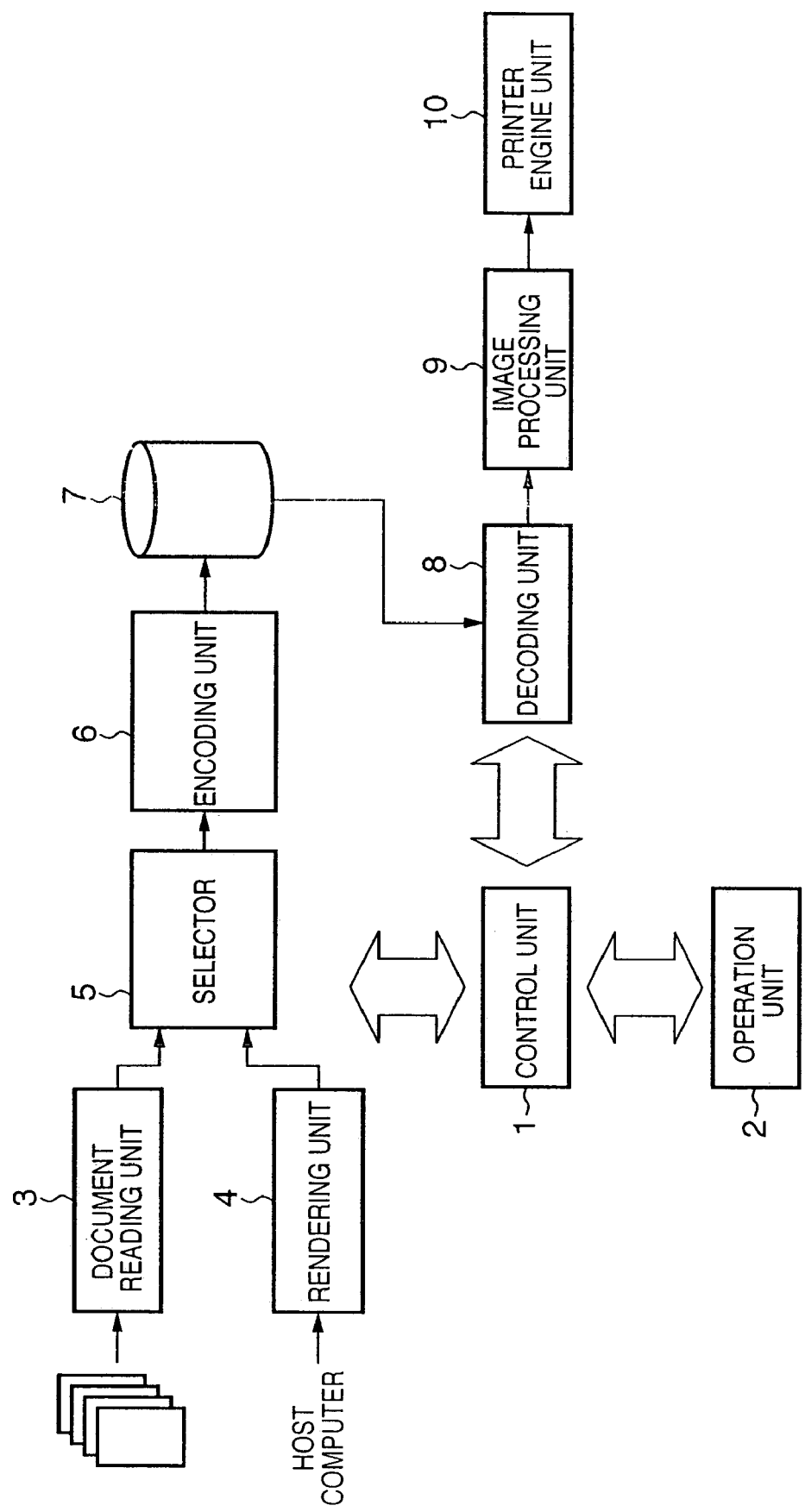
FIG. 20 is a block diagram showing a copying machine to which the embodiment is applied.

FIG. 20 is a block diagram showing a copying machine to which an embodiment is applied.

In FIG. 20, reference numeral 1 denotes a control unit which controls the overall apparatus, and is made up of a CPU, ROM, RAM, and the like. Reference numeral 2 denotes an operation unit which is made up of an LCD display, various switches, buttons, and the like. Reference numeral 3 denotes a document reading unit (image scanner unit) which includes an ADF (Auto Document Feeder). The document reading unit 3 outputs a read image as digital data of 8 bits (256 gray levels) for each of R, G, and B color components. Reference numeral 4 denotes a rendering unit which renders a print image on the basis of PDL print data received via an interface (including a network interface: not shown). Reference numeral 5 denotes a selector which selects and outputs one of bitmap images output from the document reading unit 3 and rendering unit 4 in accordance with an instruction from the control unit 1.

Reference numeral 6 denotes an encoding unit which is a feature of the embodiment. Although details of the encoding unit 6 will be described later, the encoding unit 6 encodes image data, and compression-encodes attribute information of each pixel (information representing a character-line image/halftone and a chromatic color/achromatic color). Attribute information is generated on the basis of image data when the image data is input from the document reading unit 3. As for image data from the rendering unit 4, the rendering unit 4 has determined the attribute of each rendered pixel in a rendering process based on print data, and the determined attribute is utilized.

Reference numeral 7 denotes a secondary storage device (in the embodiment, a hard disk drive) which sequentially stores encoded data output from the encoding unit 6.

Reference numeral 8 denotes a decoding unit which reads out and decodes, in the storage order, compression-encoded image data and their attribute information that are stored in the secondary storage device 7. Reference numeral 9 denotes an image processing unit which receives a decoded image from the decoding unit 8, and performs conversion from an RGB color space into a YMC print color space, a UCR (Under Color Removal) process, and a process suitable for a character-line image/halftone image area and a chromatic color/achromatic color area.

Reference numeral 10 denotes a printer engine unit whose printing mechanism is a laser beam printer engine, but can be of an arbitrary type for, e.g., discharging liquid ink.

In the above arrangement, for example, the user operates the operation unit 2 to select a copy mode, sets a document on (the ADF of) the document reading unit 3, and presses a copy start key. Then, document image data read by the document reading unit 3 are transferred in the raster order to the encoding unit 6 via the selector 5, compression-encoded by the encoding unit 6, and stored in the secondary storage device 7.

When print data is externally received, the selector 5 selects the rendering unit 4, an image based on print data generated by the rendering unit 4 is compression-encoded, and the encoded data is stored in the secondary storage device 7.

The decoding unit 8 reads out compression-encoded data from the secondary storage device 7, and decodes the readout data in accordance with the print speed of the printer engine 10. The image processing unit 9 generates print image data of Y, M, C, and K components from the decoded image data. The image processing unit 9 performs an optimal process for the print image data on the basis of decoded attribute information, and outputs the process result to the printer engine unit 10 to print.

As described above, a compression-encoded data storage process to the secondary storage device 7 and a read process for decoding and printing are asynchronous. That is, the secondary storage device 7 functions as a buffer interposed between an image compression process and a decoding process. Since a document reading/encoding process is independent of a decoding/printing process, many documents can be read at a high speed, and the process can quickly shift to document reading of the next job.

An example of a process based on attribute information in the image processing unit 9 according to the embodiment is as follows.

1. A window of a predetermined size (e.g., 5×5) centered at the position of a pixel of interest is set, and attribute information is referred to by using the window.
2. When M (M=1 in the embodiment) or more pieces of attribute information out of N (N=25 in the embodiment) pieces of character-line image/halftone attribute information in the window represent a character-line image, a pixel of interest is determined as a pixel in the character-line image area.
3. When less than M pieces of attribute information out of N pieces of character-line image/halftone attribute information in the window represent a character-line image, a pixel of interest is determined as a pixel in the halftone area.
4. When a pixel of interest is determined to fall within the character-line image area and the chromatic color/achromatic color attribute at the position of the pixel of interest represents an achromatic color, the density of the pixel of interest is obtained and simply binarized (binarized at a threshold of 128), and only the K component is made valid (Y=M=C=0).
5. When a pixel of interest is determined to fall within the character-line image area and the chromatic color/achromatic color attribute at the position of the pixel of interest represents a chromatic color, the density of the pixel of interest is obtained and simply binarized (binarized at a threshold of 128), and all the color components are made valid.
6. When a pixel of interest is determined to fall within the halftone area and the chromatic color/achromatic color attribute at the position of the pixel of interest represents an achromatic color, the density of the pixel of interest is obtained and binarized in accordance with the error diffusion method, and only the K component is made valid (Y=M=C=0).
7. When a pixel of interest is determined to fall within the halftone area and the chromatic color/achromatic color attribute at the position of the pixel of interest represents a chromatic color, all the print color components are binarized in accordance with the error diffusion method, and all the color components are made valid.

In addition to the above process, for example, there is a pre-process of correcting a decoded image in accordance with the characteristics of the printer engine. Such processes are not directly related to the present invention and are well known, and a description thereof will be omitted. The process based on the attribute information is merely an example, and does not limit the present invention.

The arrangement of the overall apparatus in the embodiment has been described. The encoding unit 6 as a feature of the apparatus will be explained in the following embodiments.

First Embodiment

Figure 1:
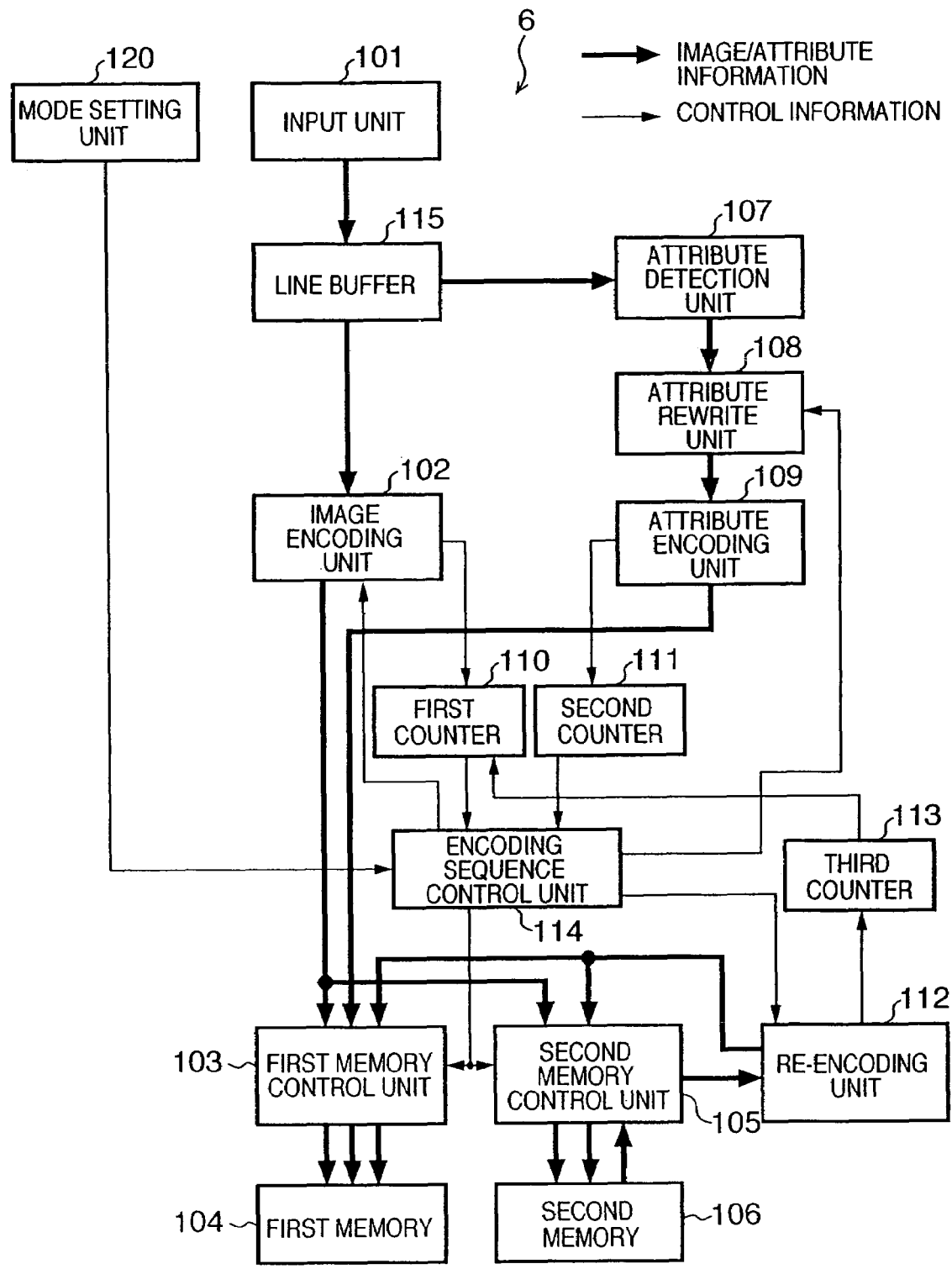
FIG. 1 is a block diagram showing an encoding unit according to the first embodiment.

FIG. 1 is a block diagram showing an encoding unit 6 according to the first embodiment. Each unit in FIG. 1 will be briefly explained.

As described above, an input unit 101 receives image data from a document reading unit 3 or rendering unit 4 via a selector 5, and outputs the image data to a line buffer 115. The line buffer has a capacity corresponding to a plurality of lines.

An image encoding unit 102 encodes image data stored in the line buffer 115, and stores the encoded data in a first memory 104 and second memory 106 via a first memory control unit 103 and second memory control unit 105.

The image encoding unit 102 according to the first embodiment adopts JPEG encoding (lossy encoding). More specifically, image data corresponding to 8×8 pixels is orthogonally transformed, quantized using a quantization step (to be described later), and undergoes a Huffman encoding process. The quantization step determines a generated code amount, and is set by an encoding sequence control unit 114. A generated code amount suffices to change in accordance with a parameter, and another compression encoding technique may be applied in addition to JPEG.

An attribute detection unit 107 generates attribute flag data of each pixel on the basis of image data stored in the line buffer 115. The attribute flag data contains a bit representing whether a pixel of interest is a character-line pixel or halftone pixel, and a bit representing whether the pixel of interest has a chromatic color or achromatic color. That is, at least 2-bit data is output. Whether a pixel of interest is a character-line pixel or halftone pixel is determined on the basis of whether a change in luminance (or density) around the pixel of interest and adjacent pixels is equal to or larger than a predetermined threshold. In chromatic color/achromatic color determination, it is determined that a pixel of interest has an achromatic color when the difference between color component values of the pixel of interest falls within a predetermined range, i.e., R≈G≈B, and otherwise the pixel of interest has a chromatic color. For descriptive convenience, bit 0 of the 2-bit attribute flag data is assigned to a character-line image/halftone determination result, and bit 1 is assigned to a chromatic color/achromatic color determination result.

An attribute rewrite unit 108 performs one of the following three processes in accordance with an instruction signal from the encoding sequence control unit 114.

Process 1. Attribute flag data output from the attribute detection unit 107 directly passes.

Process 2. Bit 0, i.e., a bit representing a "character-line image/halftone" in attribute flag data from the attribute detection unit 107 is forcibly rewritten (corrected) into a value representing "character-line image", and the rewritten bit is output.

Process 3. Bit 1, i.e., a bit representing a "character-line image/halftone" in attribute flag data from the attribute detection unit 107 is forcibly rewritten (corrected) into "halftone", and the rewritten bit is output.

An attribute encoding unit 109 encodes 8×8 attribute flag data, similar to the encoding unit in the above-described image encoding unit 102, but adopts lossless compression encoding (e.g., run length encoding). Considering the compression efficiency, 8×8 attribute flag data is encoded by dividing it into a set of bit 0s and a set of bit 1s.

Figure 18:
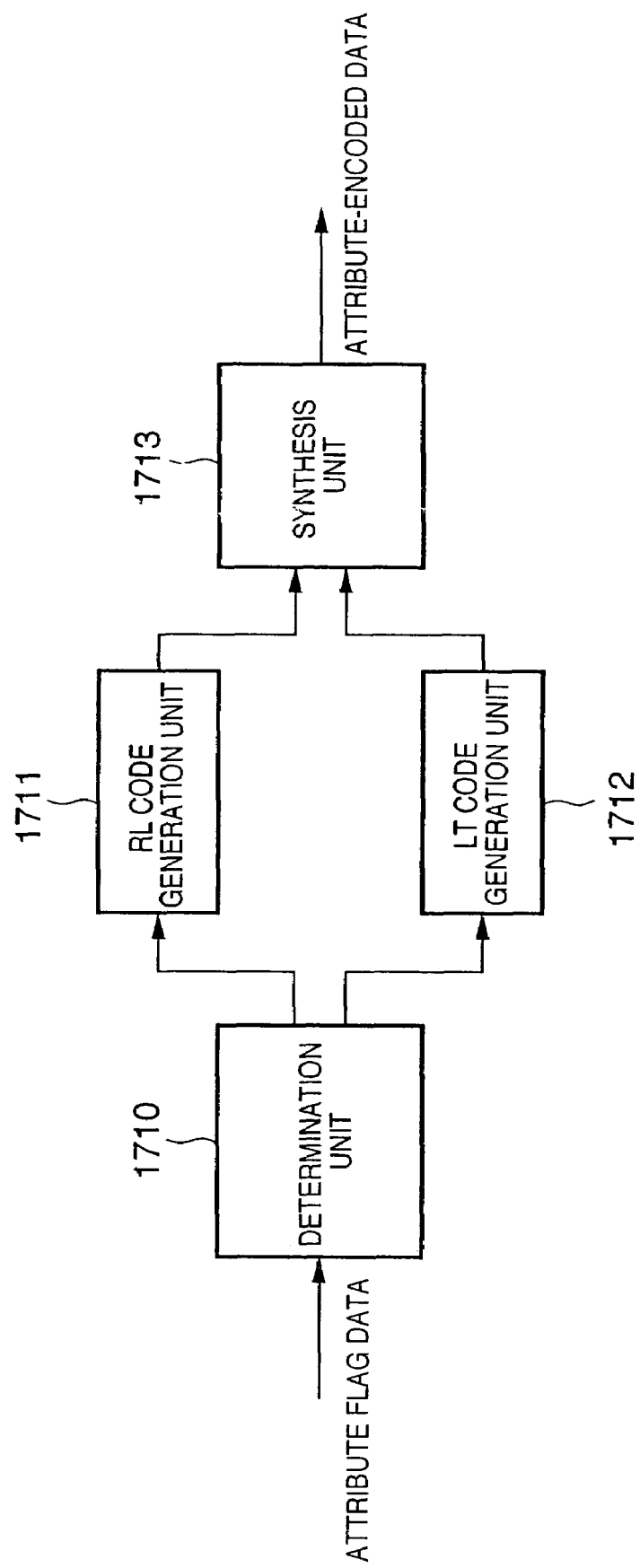
FIG. 18 is a view showing the arrangement of an attribute encoding unit according to the embodiment.

FIG. 18 shows an example of the arrangement of the attribute encoding unit 109. In FIG. 18, a determination unit 1710 determines whether the value of a preceding pixel of input attribute flag data is equal to that of the current pixel, if so, sends the data to an RL unit, and otherwise, to an LT unit.

An RL unit 1711 counts the number of data having the same value as that of preceding pixel data until data having a different value is input, and finally outputs the repeated data. An LT unit 1712 counts the number of data having values different from that of a preceding pixel, and outputs a code word corresponding to the count and the number of minimum configuration bits of actual data by the count. A synthesis unit 1713 synthesizes data output from the RL unit and data output from the LT unit, and outputs the synthesized data as a code 1715.

Referring back to FIG. 1, the attribute encoding unit 109 and image encoding unit 102 are synthesized with each other, and output encoded image data and encoded attribute flag data of the same pixel block. The encoded attribute flag data is stored in only the first memory 104, and is not stored in the second memory 106. The first memory 104 mixedly stores encoded data of images and encoded data of attribute flag data, but these data are discriminatively stored.

A first counter 110 and second counter 111 are reset every time an image of at least one page is input. The first counter 110 counts encoded data of blocks output from the image encoding unit 102. The second counter 111 counts encoded data of blocks output from the attribute encoding unit 109. In other words, the sum of counts stored in each of the first counters 110 and 111 means information representing the total encoded data amount in the first memory 104.

When a re-encoding unit 112 receives a start request from the encoding sequence control unit 114 (details of the timing will be described later), the re-encoding unit 112 decodes encoded data stored in the second memory 106, and re-encodes the data in accordance with a quantization step set by the encoding sequence control unit 114. The encoding process of the re-encoding unit 112 complies with JPEG, similar to the image encoding unit 102.

Re-encoded data is stored again in the first and second memories 104 and 106. A coded data amount after re-encoding by the re-encoding unit 112 is counted by a third counter 113. The third counter 113 is reset when the re-encoding unit 112 starts the re-encoding process. An encoded data amount generated upon the completion of re-encoding, i.e., information of the third counter 113 is output to the first counter 110 and added.

A mode setting unit 120 corresponds to a mode switch (not shown) provided to the operation panel in FIG. 20, and notifies the encoding sequence control unit 114 of which of three modes: whether to encode an image as a photographic image (to be referred to as a photograph mode hereinafter), whether to encode an image as a character-line image (to be referred to as a character-line image mode hereinafter), and whether to automatically determine and encode an input image (to be referred to as an auto mode hereinafter) has been designated.

The encoding sequence unit 114 controls the respective units in FIG. 1, and executes an encoding sequence.

Figure 19:
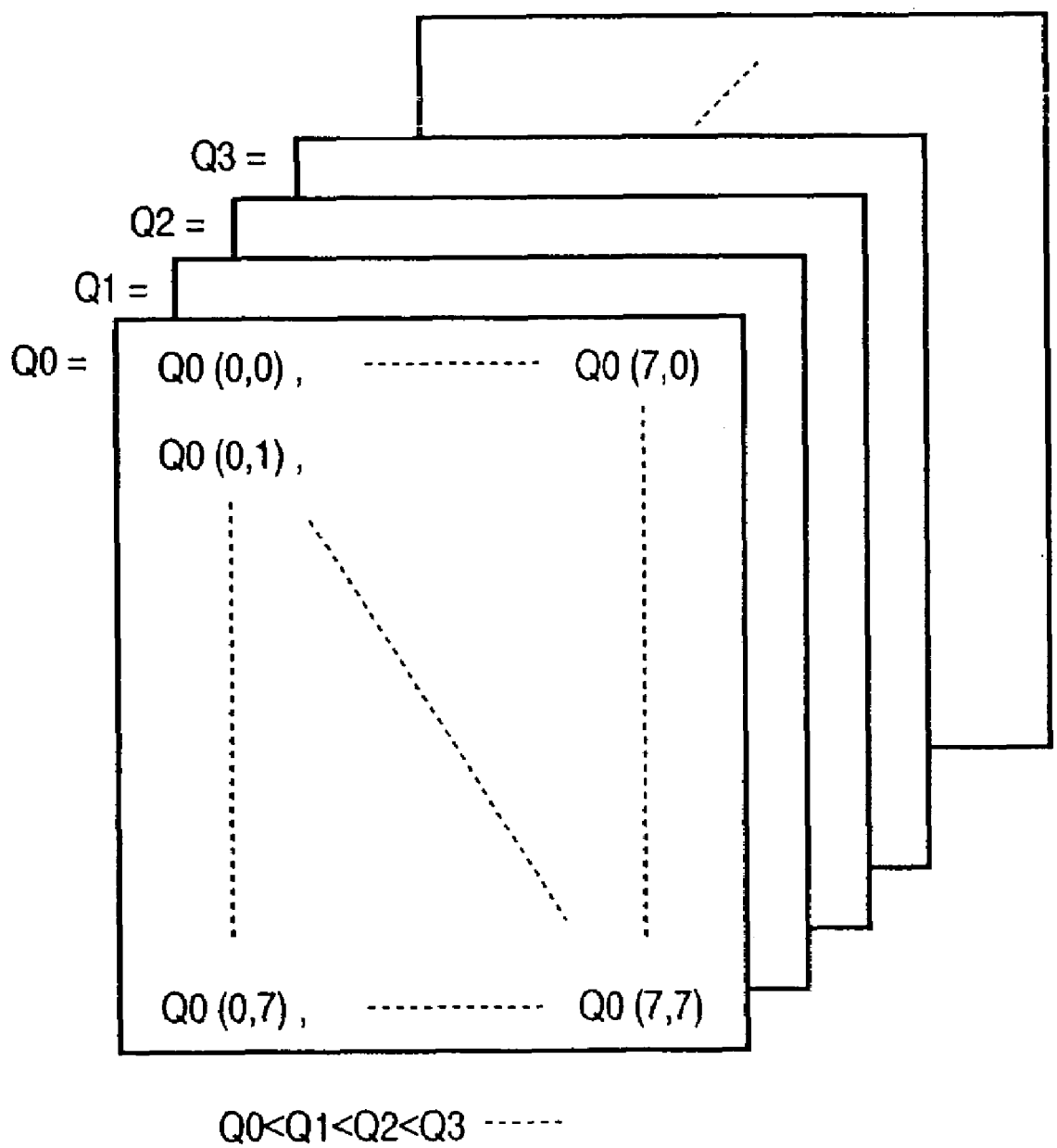
FIG. 19 is a view showing a quantization matrix table used in the embodiment.

As shown in FIG. 19, the encoding sequence control unit 114 stores and holds quantization matrix tables Q0, Q1, Q2, . . . used to quantize a frequency coefficient after DCT transformation. Values Qi(0,0) to Qi(7,7) (i=0, 1, 2, . . . ) in the quantization matrix mean quantization step values. The quantization step values generally have Q0<Q1<Q2 . . . . As the quantization step value becomes larger, a possible range of a quantized frequency coefficient value becomes narrower and the compression ratio becomes higher.

When the user operates the operation unit 2 to set a mode in copying a document, the mode setting unit 120 notifies the encoding sequence control unit 114 of the setting contents.

The mode in the first embodiment includes the auto mode (default), photograph mode, and character-line image mode, as described above. The encoding sequence control unit 114 performs an initialization process in accordance with the set mode by referring to a table shown in FIG. 21 every time a compression process of one page starts.

More specifically, when the encoding sequence control unit 114 is notified of information representing that the auto mode has been set, the encoding sequence control unit 114 sets the quantization matrix table Q0 for the image encoding unit 102, and sets the attribute rewrite unit 108 so as to directly pass attribute flag data from the attribute detection unit 107.

When the photograph mode is set, the encoding sequence control unit 114 sets the quantization matrix table Q1 for the image encoding unit 102, and sets the attribute rewrite unit 108 so as to forcibly rewrite bit 0, i.e., a bit representing a character-line image/halftone in attribute flag data from the attribute detection unit 107 into information representing "halftone".

When the character-line image mode is set, the encoding sequence control unit 114 sets the quantization matrix table Q0 for the image encoding unit 102, and sets the attribute rewrite unit 108 so as to forcibly rewrite bit 0, i.e., a bit representing a character-line image/halftone in attribute flag data from the attribute detection unit 107 into information representing "character-line image".

The quantization matrix Q0 is set in the auto mode because a read document is unknown at this stage. In order to give priority to a detection result by the attribute detection unit 107, no attribute flag data is rewritten.

In the photograph mode, the user explicitly sets that he inputs a halftone image such as a photograph. In general, the print quality of a halftone image is determined by tone reproduction rather than resolution. When the same quantization matrix (quantization step) is used, the code data amount of a photographic image tends to be larger than that of a character-line image, which will be described in detail later. As a result, the code amount reaches a target code amount (target set amount to be described later) during encoding of one page, and the re-encoding activation count of the re-encoding unit 112 increases. In order to decrease the re-encoding activation count, the quantization step at the initial stage in the photograph mode is set larger than that in the character-line image mode.

In the character-line image mode, the edge of a character is desirably saved and printed. That is, the high-frequency component of an image is desirably maintained. For this purpose, the quantization matrix Q0 having the smallest quantization step value is set at the initial stage.

<Description of Encoding Process>

The respective processing units in FIG. 1 have been described. A compression encoding process in the first embodiment will be explained.

Figure 8:
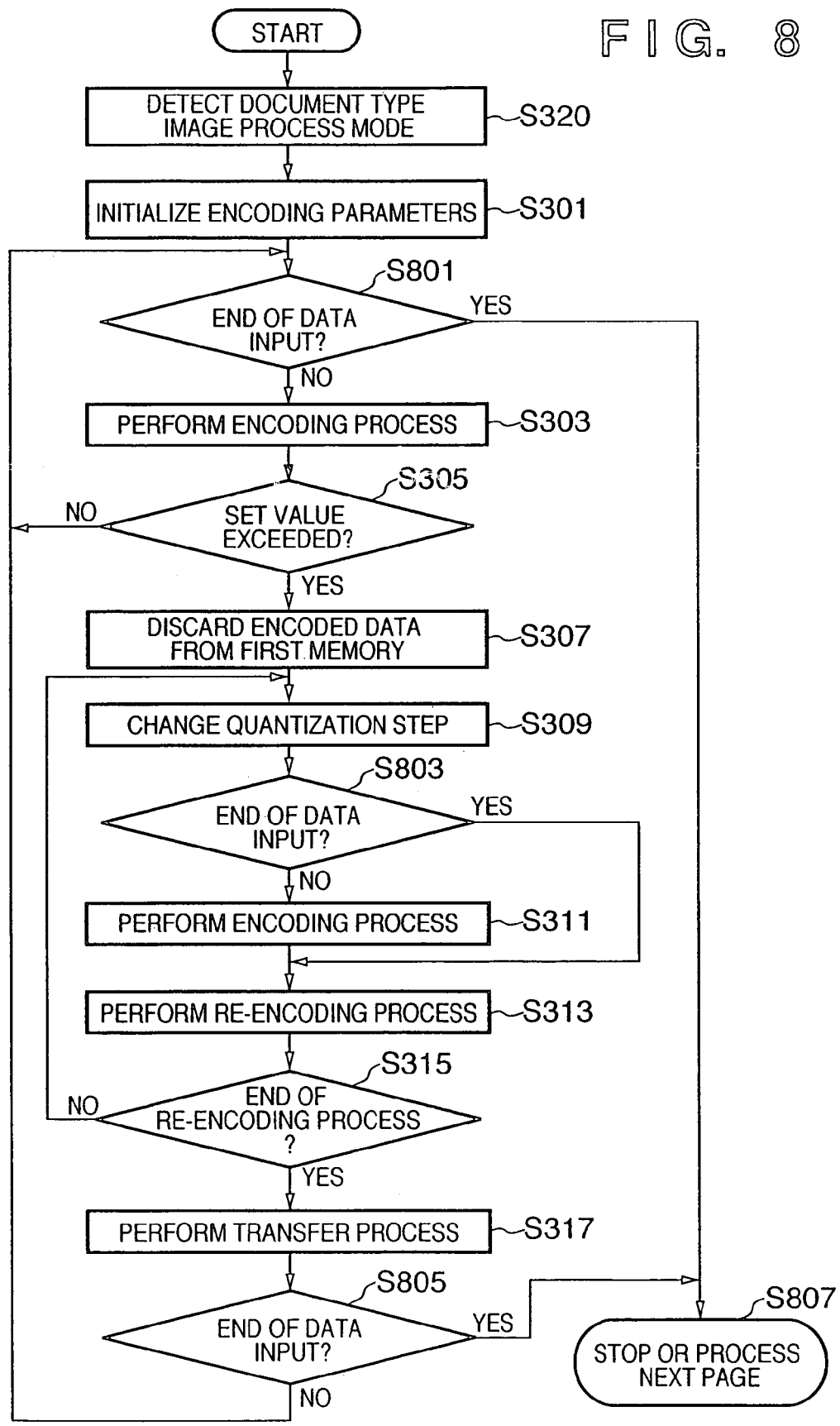
FIG. 8 is a flowchart showing the contents of an encoding process according to the first embodiment.

FIG. 8 is a flowchart showing the contents of a process by the encoding sequence control unit 114 in the arrangement of FIG. 1. For descriptive convenience, this process will be described first with reference to the simplified flowchart of FIG. 3.

Figure 3:
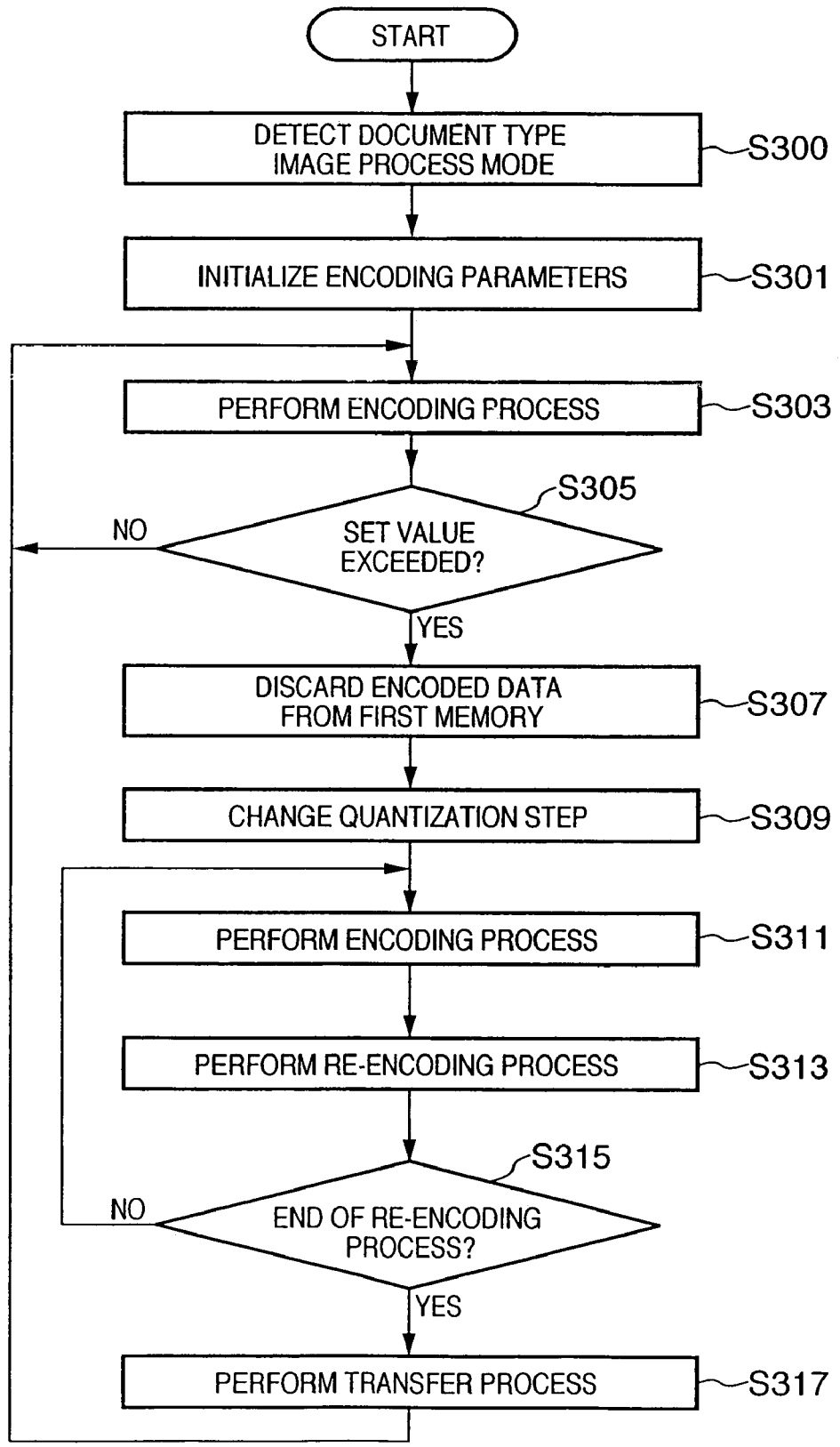
FIG. 3 is a flowchart showing simplified process contents according to the first embodiment.

The flowchart of FIG. 3 is roughly divided into the following three process phases:

(1) an encoding phase,
(2) an encoding/re-encoding phase, and
(3) a transfer phase.

FIGS. 4 to 7 visually and simply show how image data, encoded data, and the like flow and are processed and how they are stored in the memories in the respective process phases.

Figure 4:
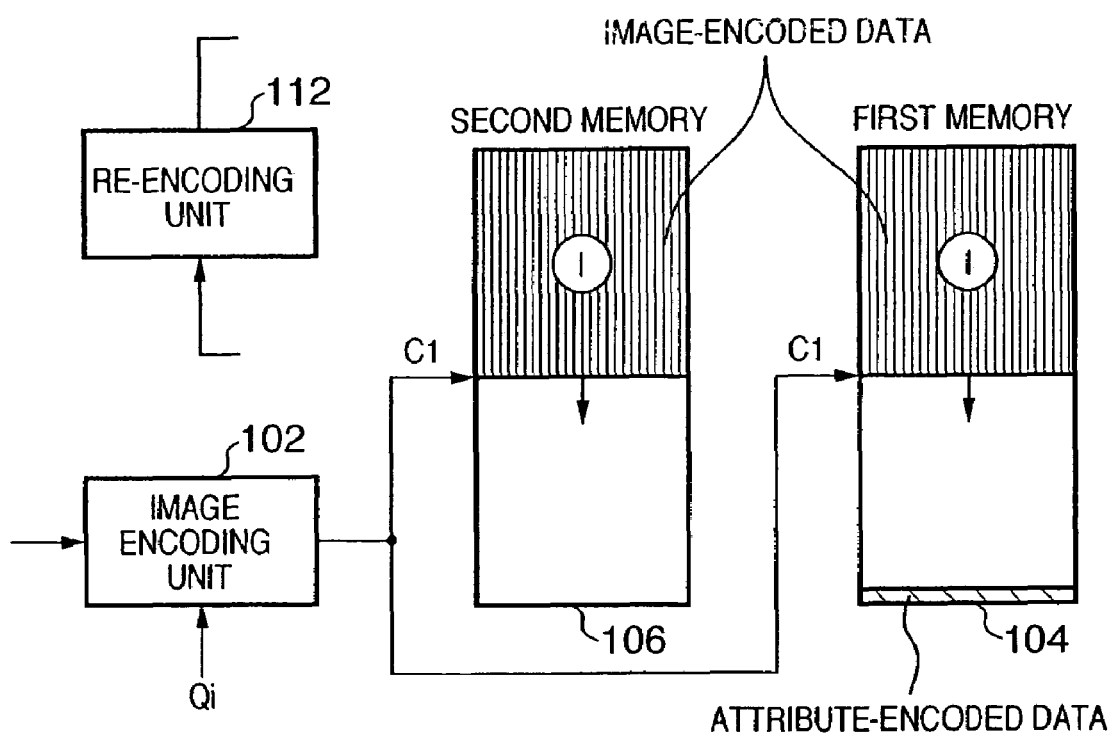
FIG. 4 is a view showing a data flow and memory storage status in the encoding phase according to the first embodiment.
Figure 5:
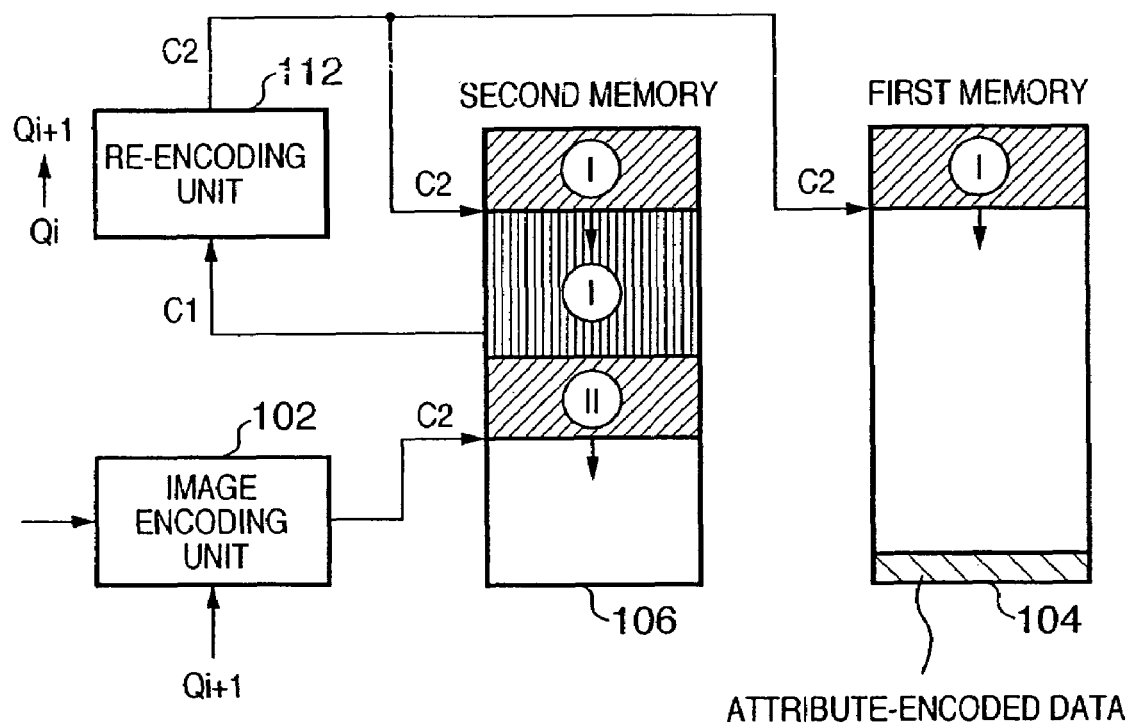
FIG. 5 is a view showing a data flow and memory storage status in the encoding/re-encoding phase according to the first embodiment.
Figure 6:
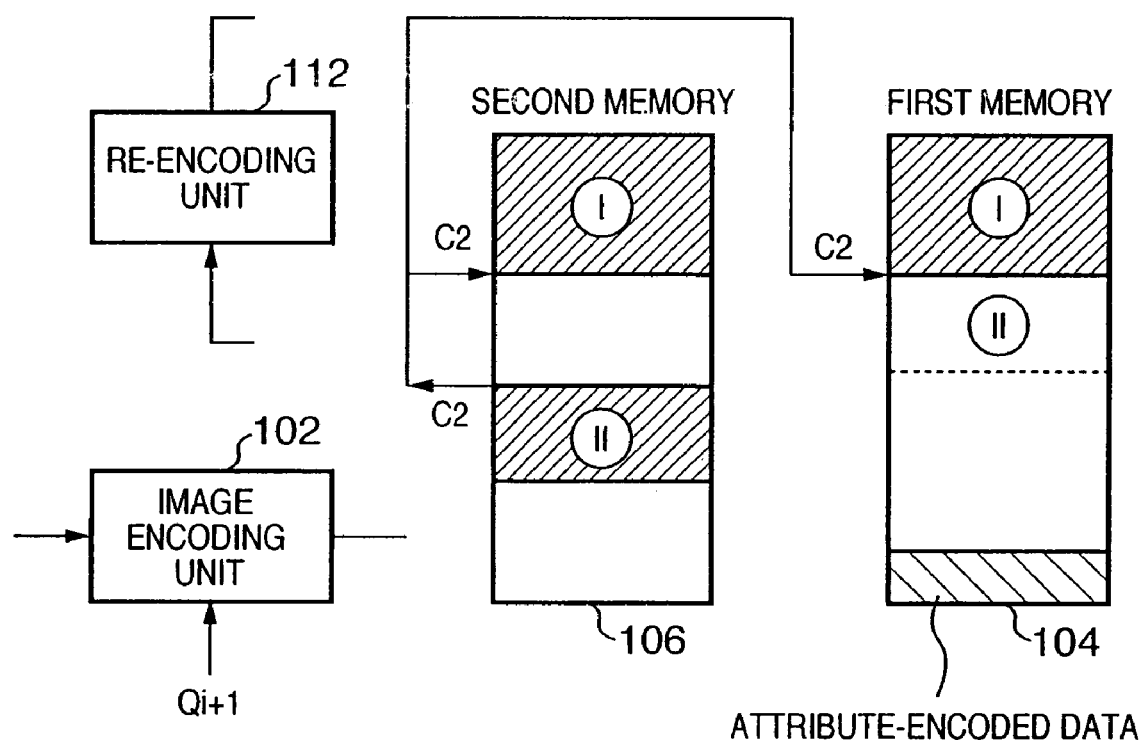
FIG. 6 is a view showing a data flow and memory storage status in the transfer phase according to the first embodiment.
Figure 7:
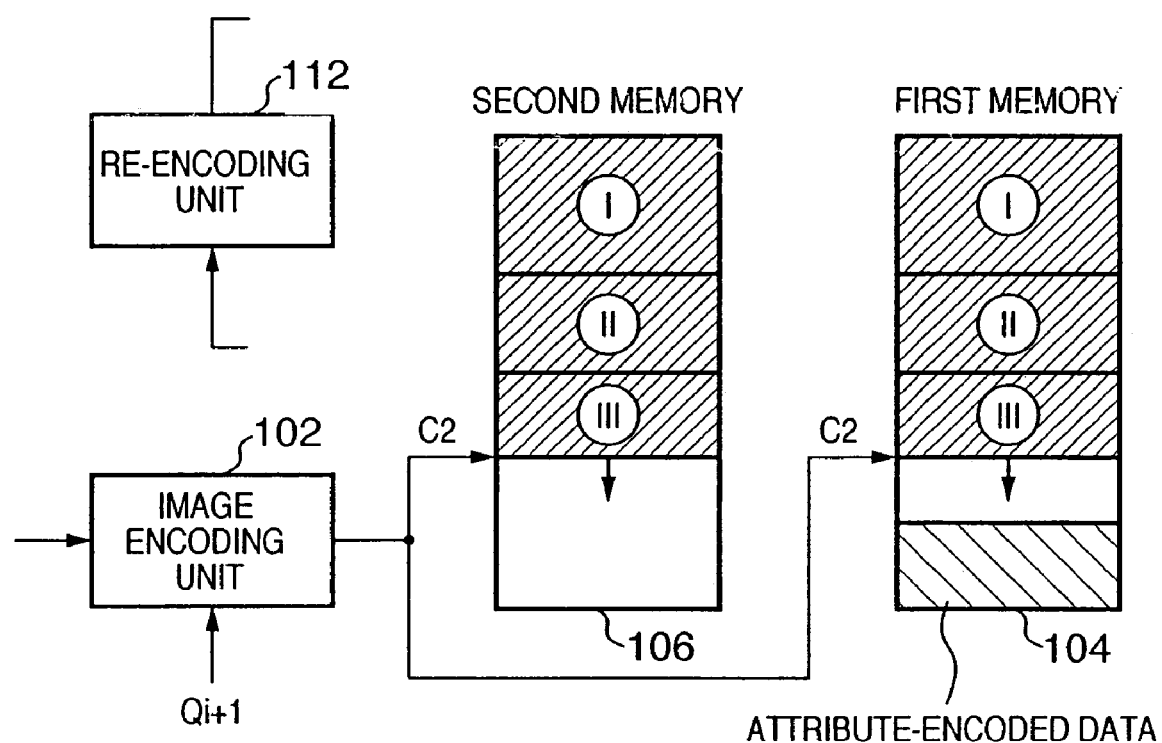
FIG. 7 is a view showing a data flow and memory storage status in the encoding phase after the transfer phase according to the first embodiment.

FIG. 4 shows the initial state of the encoding phase corresponding to steps S303 and S305 in the flowchart of FIG. 3. FIG. 5 shows the process state of the encoding/re-encoding phase corresponding to steps S307 to S315. FIG. 6 shows the process state of the transfer phase corresponding to step S317. FIG. 7 shows the process state of the encoding phase after the transfer phase. Each phase will be described below.

Note that attribute flag data in the first embodiment is not re-encoded, and only encoding of image data will be explained. To avoid any misunderstanding, attribute data will be referred to at necessary points.

<<Encoding Phase>>

An encoding process of 1-page image data starts from a process mode detection process (step S300). In this process, information from the mode setting unit 120 is detected.

Encoding parameters are initialized on the basis of the set mode (step S301). At this time, as shown in FIG. 21, an initial quantization matrix table Q (in the first embodiment, Q0 or Q1 in FIG. 19 is set at the initial stage) for the image encoding unit 102 and the attribute rewrite unit 108 are set in accordance with the set mode.

After that, reading of a document starts, and an encoding process for image data and attribute data starts (step S303). While a 1-page image is input and encoded, the sum of the values of the first and second counters 110 and 111 represents the total code data amount in the first memory 104.

The encoding sequence control unit 114 determines whether the total code amount has reached or exceeded a preset target value (to be simply referred to as "exceeds a target value" hereinafter) (step S305). If NO in step S305, the encoding process of an image and attribute flag data continues in accordance with the current set conditions. This is the encoding phase in the initial state.

The encoded data output from the image encoding unit 102 is stored in both the first and second memories 104 and 106, as shown in FIG. 4. Each area I indicated by vertical stripes expresses the stored codes. The encoding result (attribute-encoded data) of attribute flag data is stored from the end address of the first memory.

<<Encoding/Re-encoding Phase>>

As the encoding process by the image encoding unit 102 and attribute encoding unit 109 proceeds and the code amount in the first memory 104 exceeds the target value, the image-encoded data in the first memory 104 is discarded, and the first counter 110 is cleared to 0 in step S307. At this time, the attribute-encoded data in the first memory 104 is not discarded, and the second counter 111 is not initialized. In step S309, the quantization matrix table for the image encoding unit 102 is changed to a quantization matrix table larger by one step. For example, if the code data amount exceeds the target value during encoding using a quantization matrix table Qi, a quantization matrix table Qi+1 is set.

That the count value of the data amounts of encoded data exceeds a set target value indicates that the data amount after compression falls outside the target value. Since it is useless to continue the encoding process by using the same quantization matrix table, the quantization matrix table is changed to the quantization matrix table Qi+1 which is larger in quantization step width than the quantization matrix table Qi, so as to further reduce the data amount.

After the quantization matrix table for the image encoding unit 102 is updated, the encoding unit 102 continues the encoding process in accordance with the updated quantization matrix table (step S311). At this time, the encoding sequence control unit 114 controls to store encoded data from the image encoding unit 102 in only the second memory 106, as shown in FIG. 5. Since the first counter 110 is cleared to 0, the image-encoded data amount after changing the quantization matrix table starts to be counted.

In parallel to the above process, the encoding sequence control unit 114 causes the re-encoding unit 112 to start a re-encoding process in step S313. A re-encoding target by the re-encoding unit 112 is previously encoded data whose encoded data amount is determined to have exceeded the target value in the second memory 106. A quantization matrix table set for the re-encoding unit 112 at this time is the quantization matrix table Qi+1 which has been set again (updated) for the image encoding unit 102.

The re-encoding unit 112 reads out encoded data which has been stored in the second memory 106, performs the re-encoding process by using the set quantization matrix table, and stores the re-encoded data in the two memories 104 and 106. The encoding process and re-encoding process continue until all codes in the vertical stripe area I in FIG. 5 are re-encoded.

The re-encoding unit 112 may decode encoded data in the quantization matrix table Qi into image data, and perform DCT transformation, quantization based on the updated quantization table Qi+1, and Huffman encoding again, which is time-consuming. Thus, according to the first embodiment, encoded data is temporarily returned to a quantized value after Huffman decoding, the resultant value is quantized again in accordance with the ratio of the set quantization matrix table Qi+1 and previous quantization matrix table Qi, and Huffman encoding is performed. In other words, the process is simplified by eliminating DCT transformation, and the re-encoding process can be achieved at a high speed.

The re-encoding process is executed until the end of the re-encoding process is detected in step S315.

Since the data amount after re-encoding becomes smaller than the data amount of encoded data before re-encoding, the re-encoded data can be overwritten and stored in the memory area where the codes before re-encoding are stored, as shown in FIG. 5. At the end of the re-encoding process, the data amount of encoded data in the vertical stripe area I is reduced to the data amount of encoded data in an area I indicated by oblique stripes in FIG. 6.

Steps S307 to S315 described above represent a process performed in the encoding/re-encoding phase.

<<Transfer Phase>>

When the re-encoding process is terminated, a transfer process is performed in step S317. In this transfer process, as shown in FIG. 6, the encoded data in an oblique stripe area II that is stored in only the second memory 106 in the encoding/re-encoding phase is transferred to an address at which the data is concatenated to the encoded data indicated by the oblique stripes I in the first memory 104, and stored at the address. The encoded data amount obtained by re-encoding by the re-encoding unit 112 is held in the third counter 113, and added to the first counter 110. As a result, the first counter 110 holds again the encoded data amount of image data stored in the first memory 104. Meanwhile, the encoded data indicated by the oblique stripes II is transferred into the second memory 106 and concatenated such that the encoded data indicated by the oblique stripes I and the encoded data indicated by the oblique stripes II which are scattered in the second memory 106 are continuously stored in the first memory 104. This process is done in the transfer phase.

When the above transfer phase is terminated, the flow returns to the encoding phase in steps S303 and S305 to set the encoded data output from the image encoding unit 102 so as to be stored in both the first and second memories 104 and 106. As a result, data in an oblique stripe area III are stored in the two memories 104 and 106, as shown in FIG. 7. In the encoding phase, unlike in the encoding phase in the initial state (FIG. 4), the quantization step used to encode data by the encoding unit 102 is changed from Qi to Qi+1, and the encoded data stored in the two memories 104 and 106 are a set of codes processed in various phases. If these differences are neglected, the encoding phase immediately after the transfer phase can be regarded identical to the encoding phase in the initial state.

By repeating the three, encoding, encoding/re-encoding, and transfer phases, codes obtained by compressing 1-page image data into a set code amount or less can be finally stored in the first memory. The input unit 101 only continues input operation until the end of a series of processes. That is, an image need not be input again from the beginning.

The flowchart shown in FIG. 3 describes only processes corresponding to the respective phases shown in FIGS. 4, 5, and 6 for easy understanding. In practice, however, input of 1-page image data comes to an end in some phase. Depending on the phase where the input operation comes to an end, the subsequent process slightly differs. The flowchart of FIG. 8 shows the flow of a process in consideration of this. The flowchart shown in FIG. 8 is based on the relationship between the completion of input of 1-page image data and each kind of process described with reference to FIG. 3. In this case, steps S801, S803, S805, and S807 are added to the flowchart of FIG. 3.

In steps S801, S803, and S805, it is checked whether input of 1-page image data from the input unit 101 is completed in the encoding phase, encoding/re-encoding phase, and transfer phase.

If it is detected that input of 1-page image data is completed in the encoding phase and transfer phase (steps S801 and S805), the flow advances to step S807 to terminate a compression encoding process for the page. If there is image data to be compressed next, the compression encoding process for the next 1-page image data starts (each counter is reset and the quantization parameter is reset to an initial value). If there is no data to be compressed, a halt condition is set.

If the end of input of 1-page image data is detected in the encoding/re-encoding phase (step S803), the operation of the image encoding unit 102 needs to be stopped until there is no image data to be re-encoded. For this reason, the encoding process in step S311 is passed, and only the re-encoding process is continued in step S313 to suppress, within a predetermined encoded data amount, the image data which has already been encoded by the encoding unit 102. If the subsequent transfer process is not terminated after the re-encoding process is terminated for all data, the overall encoded data of 1-page image data is not collected in the first memory, the re-encoding process and subsequent transfer process must be continuously performed even after the end of input of 1-page image data. In this case, if it is detected in step S315 that the re-encoding process is terminated for all data, the encoded data stored in only the second memory 106 is transferred to the first memory during the encoding/re-encoding phase (step S317). Thereafter, the end of input of 1-page image data is detected in step S805, and the flow advances to step S807. The above description has been made on the process by the image encoding unit 6 according to the first embodiment, and also on the operation in FIG. 8.

Figure 9:
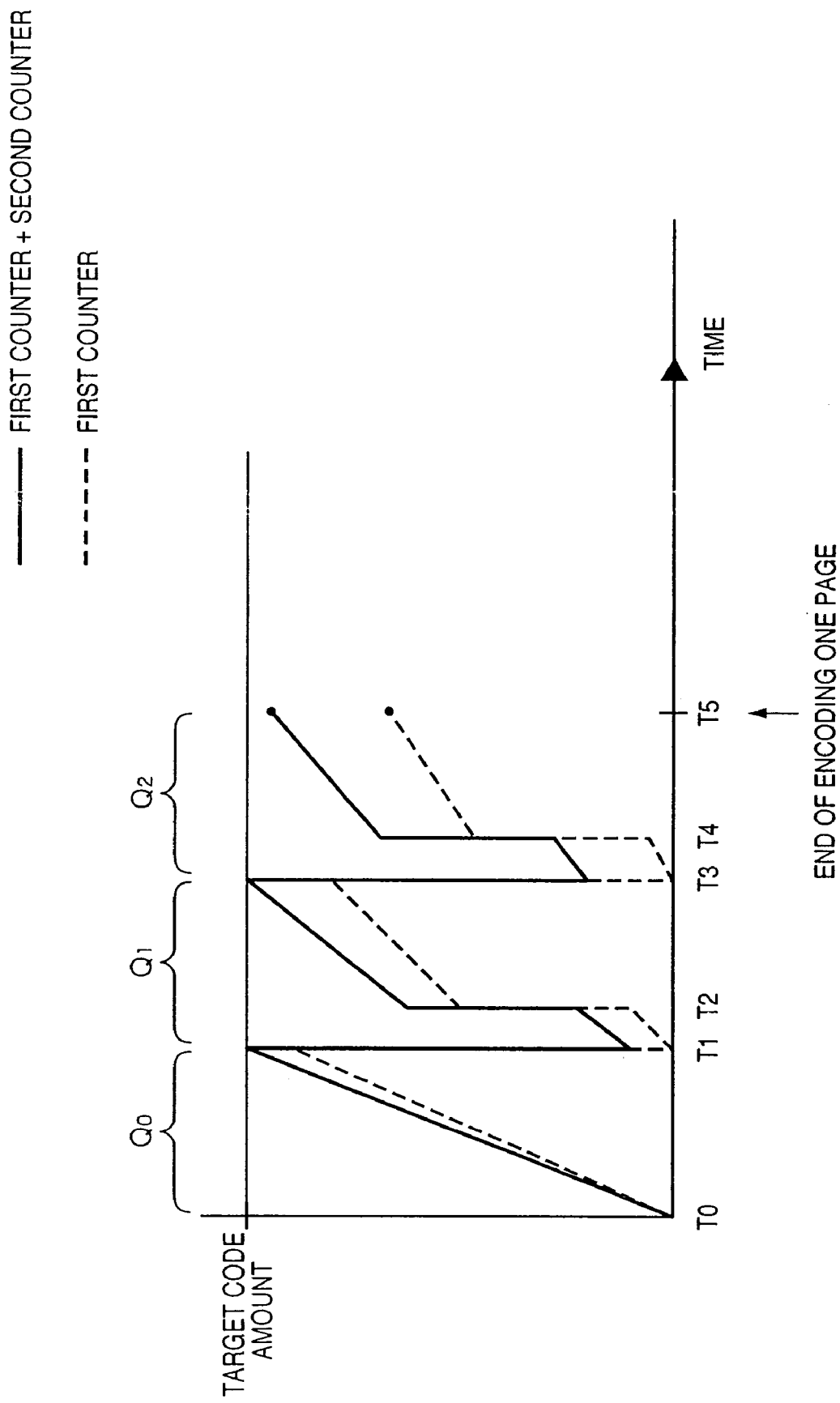
FIG. 9 is a timing chart showing an example of transition of the values of the first and second counters according to the first embodiment.

FIG. 9 shows an example of transition of the values (code amounts) of the first and second counters 110 and 111 along the time axis. In FIG. 9, the solid line represents the sum of the value (image-encoded data amount) of the first counter 110 and the value (attribute-encoded data amount) of the second counter 111. The broken line represents the value of the first counter 110. It should be noted that the image encoding unit 102 and attribute encoding unit 109 in the first embodiment adopt variable-length encoding, and thus the two count values monotonically increase but do not linearly increase. In FIG. 9, the character-line image mode is set, i.e., the initial quantization matrix table Q0 is set for the image encoding unit 102, and the bit assigned to a character-line image/halftone from the attribute detection unit 107 is forcibly rewritten into a character-line image by the attribute rewrite unit 108.

In FIG. 9, input of a document image starts at timing T0 and is completed at timing T5. Timing T5 is fixed as far as the size of an input document is fixed. A process at each timing will be explained.

Timing T0:

Timing T0 is an image input start (encoding start) timing. At this time, the values of the first and second counters 110 and 111 are initialized to "0". Since the character-line image mode is set in the example of FIG. 9, the attribute rewrite unit 108 forcibly rewrites (masks) the bit assigned to a character-line image/halftone in attribute flag data from the attribute detection unit 107 into a bit representing a "character-line image". As input and encoding of an image continue, the image and attribute flag data are encoded, and the count values of the first and second counters 110 and 111 gradually increase.

Timing T1:

At timing T1, the sum of encoded data of image data and encoded data of attribute flag data reaches a target code amount. At this time, encoded data of image data in the first memory 104 is discarded, the first counter 110 is cleared to 0, and the quantization matrix table Q1 is set for the image encoding unit 102. The quantization matrix table Q1 is also set for the re-encoding unit 112, and the re-encoding process starts.

Timing T2:

At timing T2, the re-encoding and transfer processes are completed. Upon the completion of re-encoding, re-encoded data is transferred from the second memory 106 to the first memory 104, and the value of the third counter 113 representing the re-encoded data amount is added to the first counter 110. Consequently, the first and second memories 104 and 106 store encoded data equivalent to data obtained such that image data input from the start of one page till timing T2 are encoded by the quantization matrix table Q1.

Timing T3:

At timing T3, the sum of encoded data of image data and encoded data of attribute flag data reaches a target code amount again. At this time, encoded data of image data in the first memory 104 is discarded, the first counter 110 is cleared to 0, and the quantization matrix table Q2 is set for the image encoding unit 102. The quantization matrix table Q2 is also set for the re-encoding unit 112, and the re-encoding process starts.

Timing T4:

At timing T4, the re-encoding and transfer processes are completed. Upon the completion of re-encoding, re-encoded data is transferred from the second memory 106 to the first memory 104, and the value of the third counter 113 representing the re-encoded data amount is added to the first counter 110. As a result, the first and second memories 104 and 106 store encoded data equivalent to data obtained such that image data input from the start of one page till timing T2 are encoded by the quantization matrix table Q2.

Timing T5:

At timing T5, input of the 1-page document is completed. In this case, the first memory 104 stores encoded data of the 1-page image and encoded data of attribute flag data, and outputs the results to the secondary storage device 7.

To read the second document image, the process is repeated from timing T1.

Depending on an image, the sum of the values of the first and second counters 110 and 111 may exceed a target amount immediately before timing T5 at which input of a document image is completed. In this case, the re-encoding and transfer processes are done after timing T5. A condition that encoded data of image data and attribute flag data which are stored in the first memory 104 are output to the secondary storage device 7 is that input of a document image is completed and encoding (re-encoding and transfer) is also completed.

An encoded data amount to be re-encoded by the re-encoding unit 112 tends to increase as the number by which the sum of the values of the first and second counters exceeds a target value increases. In other words, as the number by which the sum exceeds the target value is smaller, the time taken for the encoding process is shorter. In the first embodiment, when the photograph mode is selected, the initial quantization matrix table Q1 is used, which has a value larger than the initial setting Q0 in the character-line image mode. The target value exceeding count in the photograph mode can be decreased, and efficient encoding can be expected.

According to the first embodiment, when the type of document to be copied by the user is known in advance, the photograph mode or character-line image mode is explicitly designated, and attribute flag data is rewritten in accordance with the designated mode, printing at high quality.

<<Modification of Memory Storage Method>>

Figure 10:
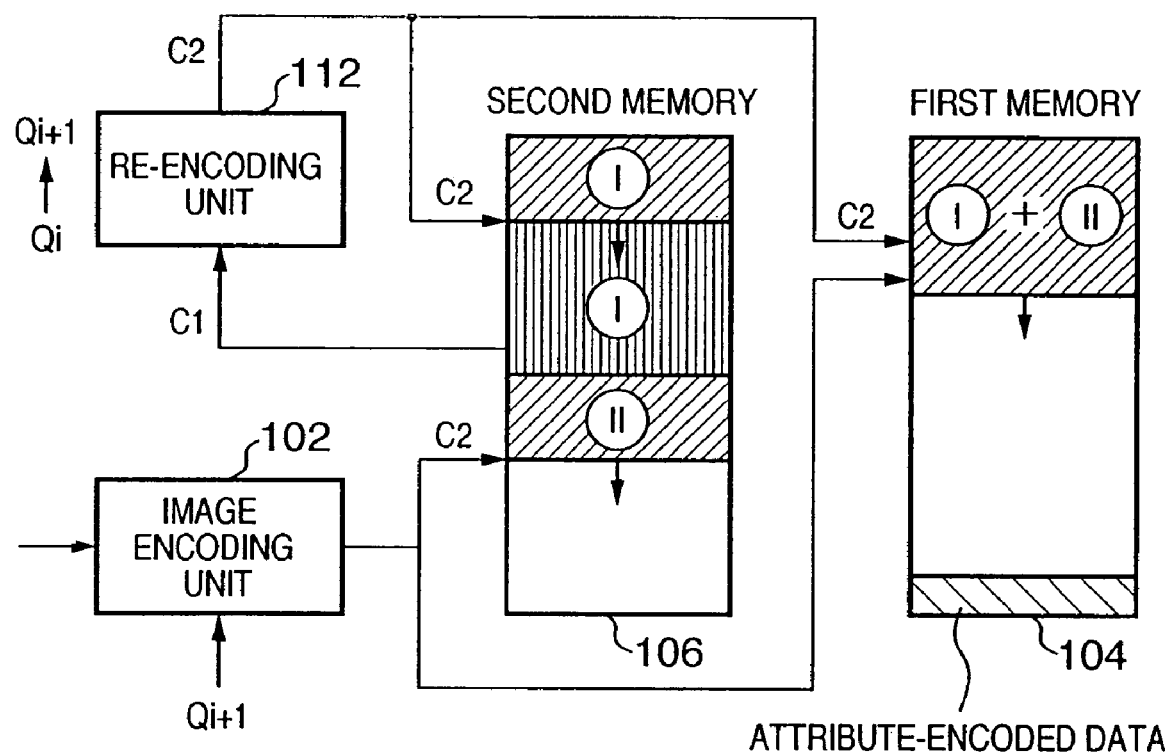
FIG. 10 is a view showing the contents of a data flow and memory storage status in a modification of the re-encoding phase according to the first embodiment.

FIG. 10 is a view showing a modification of the memory storage method shown in FIG. 5.

In FIG. 5, encoded data output from the encoding unit 102 is stored in only the second memory 106 in the encoding/re-encoding phase. To the contrary, as shown in FIG. 9, encoded data output from the encoding unit 102 may be directly stored in both the first and second memories in the encoding/re-encoding phase. That is, when the total encoded data amount exceeds a target value, encoded data based on an updated quantization matrix table and re-encoded data are simultaneously stored in the first memory 104, as shown in FIG. 10.

Figure 11:
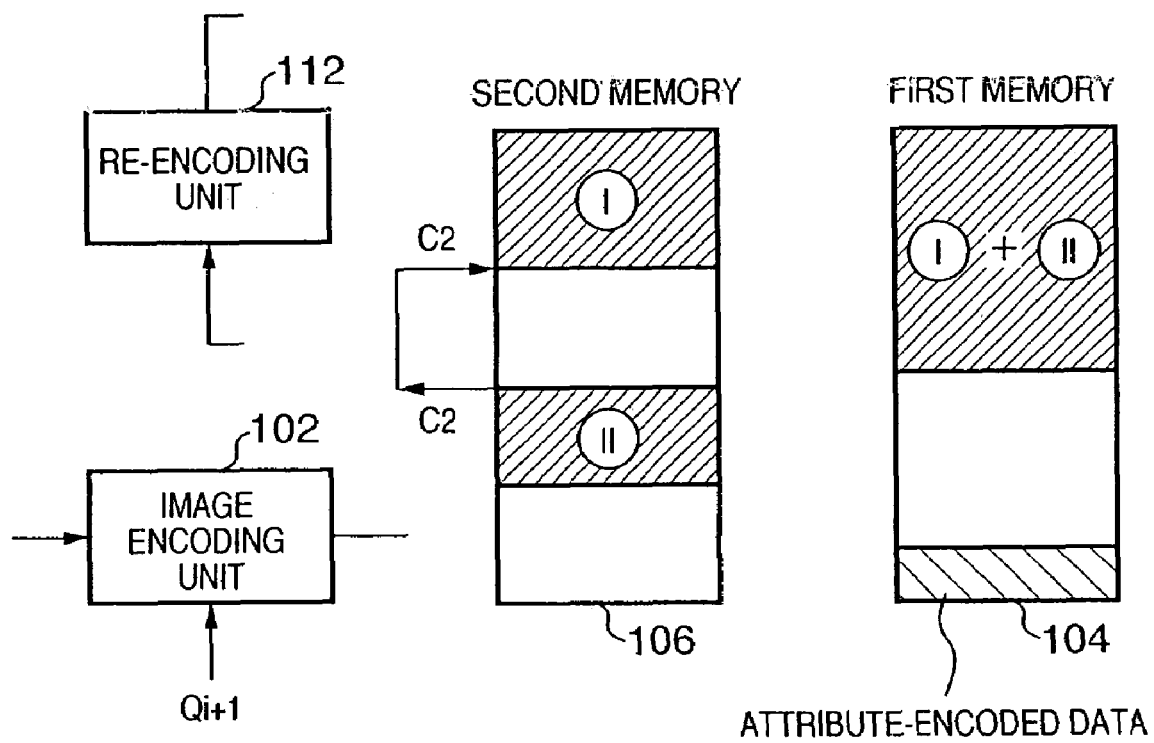
FIG. 11 is a view showing a data flow and the contents of a memory storage status in the encoding phase after the transfer phase according to the first embodiment.

When viewed from the encoding unit 102, data which is encoded in any phase and output is stored in the two memories. FIG. 11 shows transfer of encoded data in the second memory 106 immediately upon the completion of re-encoding. As shown in FIG. 11, the transfer process is performed within only the second memory, and does not influence the first memory 104.

According to the modification, in the encoding/re-encoding phase, encoded data and re-encoded data are sequentially stored in the first memory 104 in the order in which they are transferred. For this reason, two types of data are undesirably mixed. In this modification, in order to solve this problem, encoded data is divided into certain unit data and managed as files or packets. More specifically, such unit data are managed by separately forming a file management table, packet management table, or the like.

Figure 12:
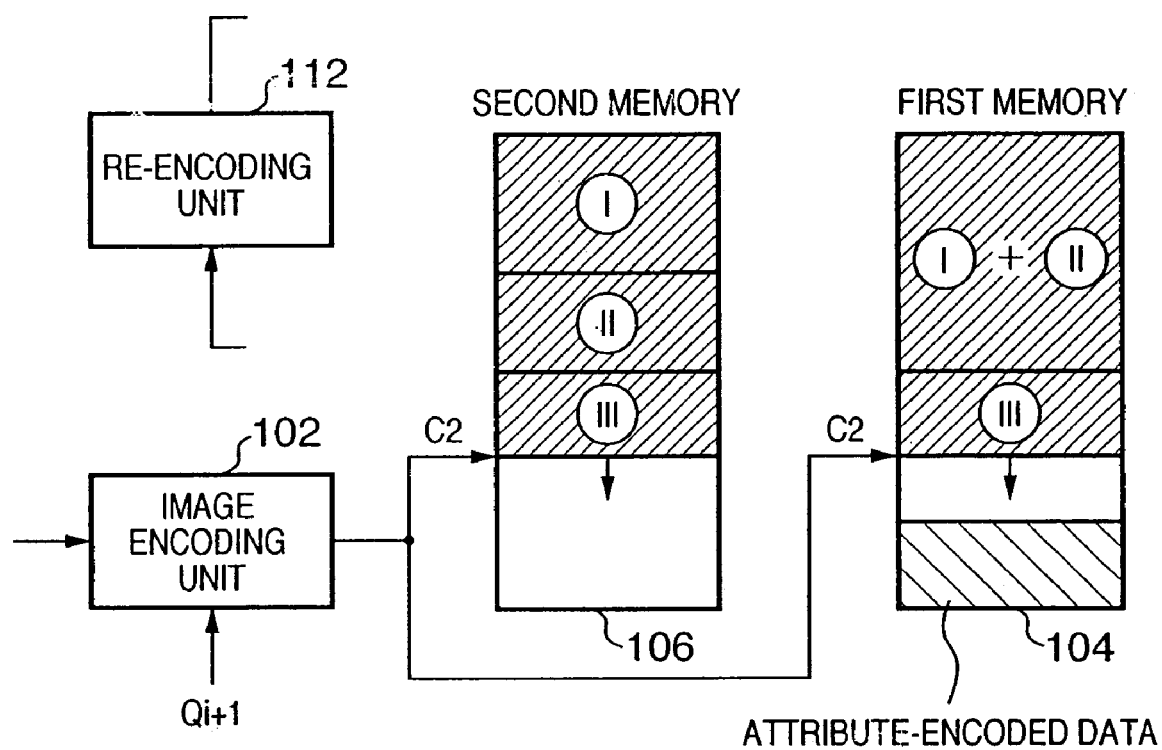
FIG. 12 is a view showing a data flow and the contents of a memory storage status in the encoding phase after the transfer phase according to the first embodiment.

The encoding phase after the transfer phase in the conceptual view of FIG. 12 is almost the same as the two encoding phases described above (FIGS. 4 and 7) except that the stored state of codes in the first memory slightly differs from that shown in FIG. 11. Therefore, the preceding description and this modification are the same in terms of repeating the three phases.

Second Embodiment

Figure 2:
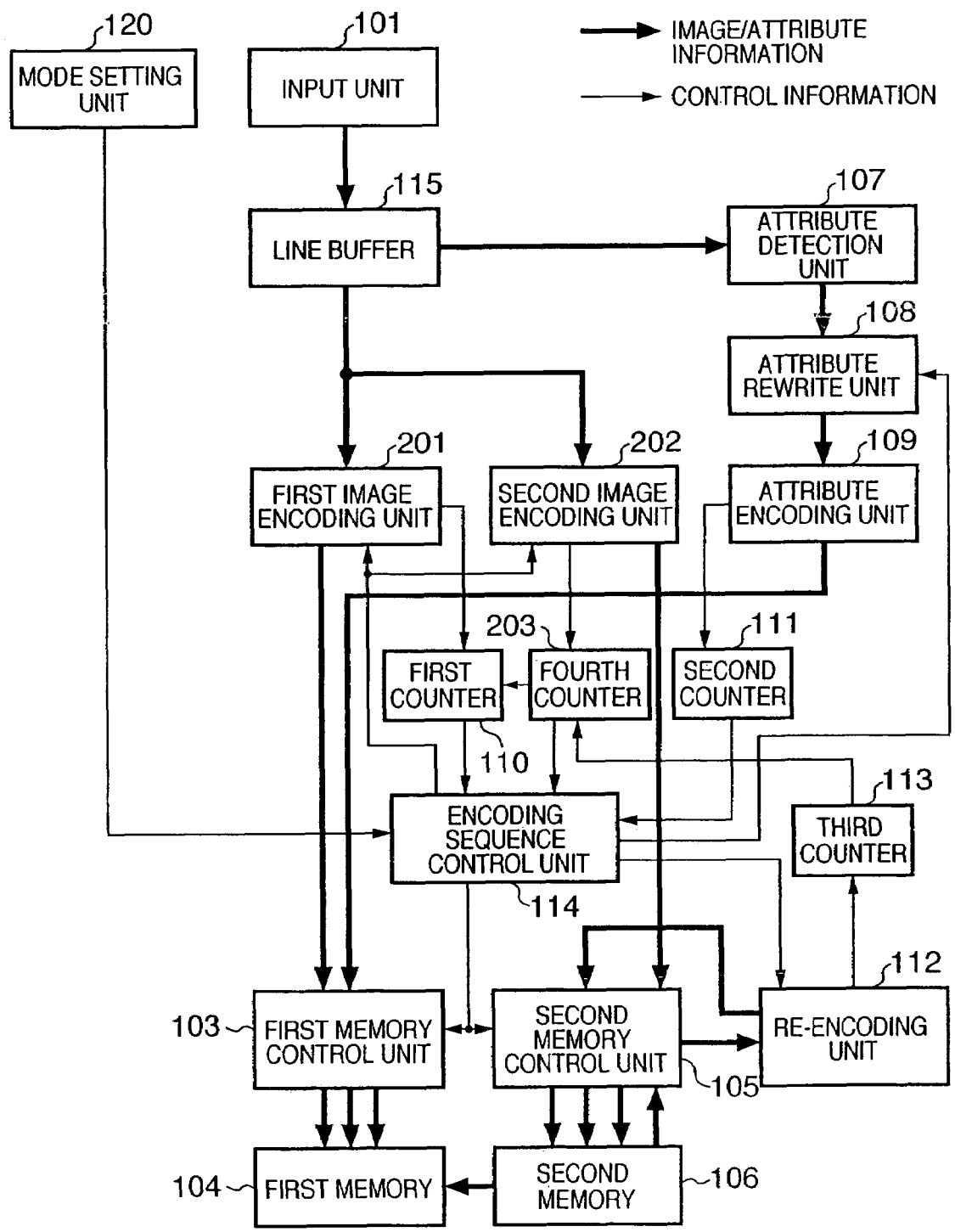
FIG. 2 is a block diagram showing an encoding unit according to the second embodiment.

The second embodiment according to the present invention will be described. The arrangement of an encoding unit 6 according to the second embodiment is shown in FIG. 2.

In FIG. 1, a processing unit which encodes an image is only one image encoding unit 102. To the contrary, in FIG. 2, two, first and second image encoding units 201 and 202 are arranged, these two encoding units parallel-execute an encoding process. Further, a fourth counter 203 is arranged which cumulatively counts an encoded data length generated by the second image encoding unit 202.

The first and second image encoding units 201 and 202 in the second embodiment perform JPEG encoding, similar to the image encoding unit 102 in the first embodiment.

An outline of a process in the arrangement of FIG. 2 will be explained.

Encoded data output from the first image encoding unit 201 is stored in a first memory 104 via a first memory control unit 103. At this time, a first counter 110 cumulatively counts and holds a code length output from the image encoding unit 201, and outputs the code length to an encoding sequence control unit 209.

Data encoded by the second image encoding unit 202 is stored in a second memory 106 via a second memory control unit 105. At this time, the fourth counter 203 cumulatively counts and holds a code length output from the image encoding unit 202.

The first image encoding unit 201 corresponds to the image encoding unit 102 in the first embodiment.

When a document input mode is set by a mode setting unit 120, a quantization matrix table as shown in FIG. 21 is set for the first image encoding unit 201, and an attribute rewrite unit 108 processes a rewrite request as shown in FIG. 21.

In the second embodiment, when a quantization matrix table Qi is set for the first image encoding unit 201, a quantization matrix table Qi+1 larger by one step is always set for the second image encoding unit 202. Hence, when the photograph mode is set as an input mode, the quantization matrix table Q1 is set for the first image encoding unit 201 prior to input of a 1-page document image, and the quantization matrix table Q2 is set for the second image encoding unit 202.

The remaining arrangement is almost the same as that in the first embodiment. In the first embodiment, the first counter 110 which counts the total code amount of image data and attribute data is temporarily cleared to 0 when the total code amount exceeds a target value during input of a 1-page image. The first counter 110 holds an accurate total code amount again after re-encoding by a re-encoding unit 112 is completed. That is, the total code amount becomes temporarily unknown at an interval between timings T1 and T2 and an interval between timings T3 and T4 in FIG. 9. When input of a document image ends at timing T5, but the total code amount accidentally exceeds the target value immediately before timing T5, no next document image can be input until re-encoding by the re-encoding unit 112 is completed.

The second embodiment solves the above problem. The operation will be explained on the basis of the arrangement of FIG. 2.

Prior to a description, it should be noted that an encoding sequence control unit 114 can detect, from the sum of the values of the first counter 110 and a second counter 111, the encoded data amount (total code amount) of image data and attribute flag data which are stored in the first memory 104. As described above, the second image encoding unit 202 encodes image data by using a quantization matrix table larger by one step than that for the first image encoding unit 201, and the code amount by the second image encoding unit 202 is held in the second counter 111. Prior to reading of a document, the mode setting unit 120 notifies the encoding sequence control unit 114 of mode selection contents, and parameters corresponding to the set mode are set in the first image encoding unit 201, second image encoding unit 202, and attribute rewrite unit 108.

When the total code amount (=first counter+second counter) is determined to exceed a target value, the encoding sequence control unit 114 executes the following process. Let Qi be a quantization matrix table which is set for the first image encoding unit 201 before the total code amount exceeds the target value, and Qi+1 be a quantization matrix table which is set for the second image encoding unit 202.

1. The encoding sequence control unit 114 requests the first memory control unit 103 to discard encoded data of image data in the first memory 104. Attribute-encoded data is kept held in the first memory 104.
2. Encoded data (encoded data of image data based on the quantization matrix table Qi+1) stored in the second memory 106 is transferred to the first memory 104. Along with this, the value of the fourth counter 203 is transferred to the first counter 110 in order to update the first counter 110 to the value of the fourth counter 203. After the counter value is transferred, the fourth counter 203 is cleared to 0. In short, the count value of the fourth counter 203 expresses the data amount of encoded data stored in the second memory 106, and the count value and encoded data are copied to the first counter 110 and first memory 104 so as not to change the correspondence between the count value and the encoded data. Encoded data may be transferred by DMA or the like.
3. The quantization matrix table Qi+1 is set for the first image encoding unit 201, and the quantization matrix table Qi+2 is set for the second image encoding unit 202. Then, the encoding process by the first and second image encoding units 201 and 202 resumes (continues).
4. The same quantization matrix table Qi+2 as that for the second image encoding unit 202 is set for the re-encoding unit 112, and the re-encoding unit 112 re-encodes encoded data stored in the second memory 106 (data encoded on the basis of the quantization matrix table Qi+1). The re-encoded data is stored in the second memory 106 again. At this time, a third counter 113 measures a re-encoded data amount. Upon the completion of the re-encoding process, the value of the third counter 113 is added to the fourth counter.

Of processes 1 to 4, processes 1 to 3 can be performed at a speed high enough to input image data from the input unit 101. For this reason, a period during which the total code amount is unknown, like an interval between timings T1 and T2 or an interval between timings T3 and T4 in FIG. 9, can be substantially ignored. If the total code amount exceeds the target value immediately before timing T5 in FIG. 9, process 4 starts, and at timing T5, encoded data in the first memory 104 can be output to a secondary storage device 7 without waiting for the completion of the re-encoding process (or by interrupting the re-encoding process).

An outline of operation in the arrangement of FIG. 2 has been described. When there are two image encoding units, like the second embodiment, 1-page image data is encoded on the basis of the flowchart shown in FIG. 13.

Figure 13:
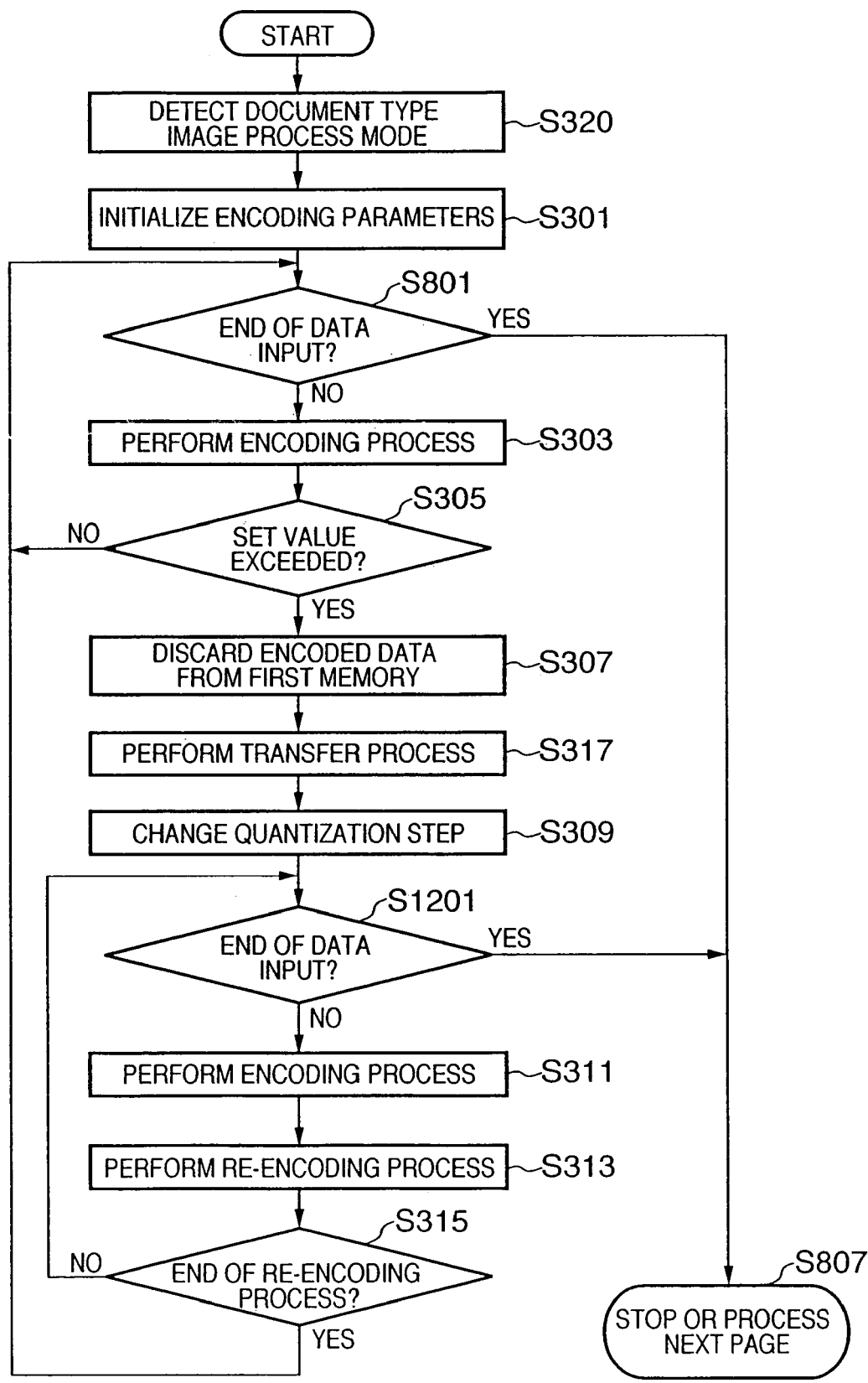
FIG. 13 is a flowchart showing the contents of an encoding process according to the second embodiment.

Note that most of the description made with reference to FIG. 13 is similar to that made with reference to FIG. 8 for the case wherein one encoding unit is used. The process will be described in three phases as in the case wherein one encoding unit is used, and points different from those in FIG. 8 will be mainly described below.

The largest difference between the flow of FIG. 8 and that of the second embodiment is that the transfer process in step S317 is moved between step S307 and step S309. It can be regarded that the encoding/re-encoding phase and the transfer phase are interchanged.

In initial setting of encoding parameters in step S301, an initial quantization matrix table Qi to be set for the first image encoding unit 201 is determined by referring to the table shown in FIG. 21 in accordance with a mode set by the mode setting unit 120, and a quantization matrix table Qi+1 larger by one step is set for the second image encoding unit 202.

Figure 14:
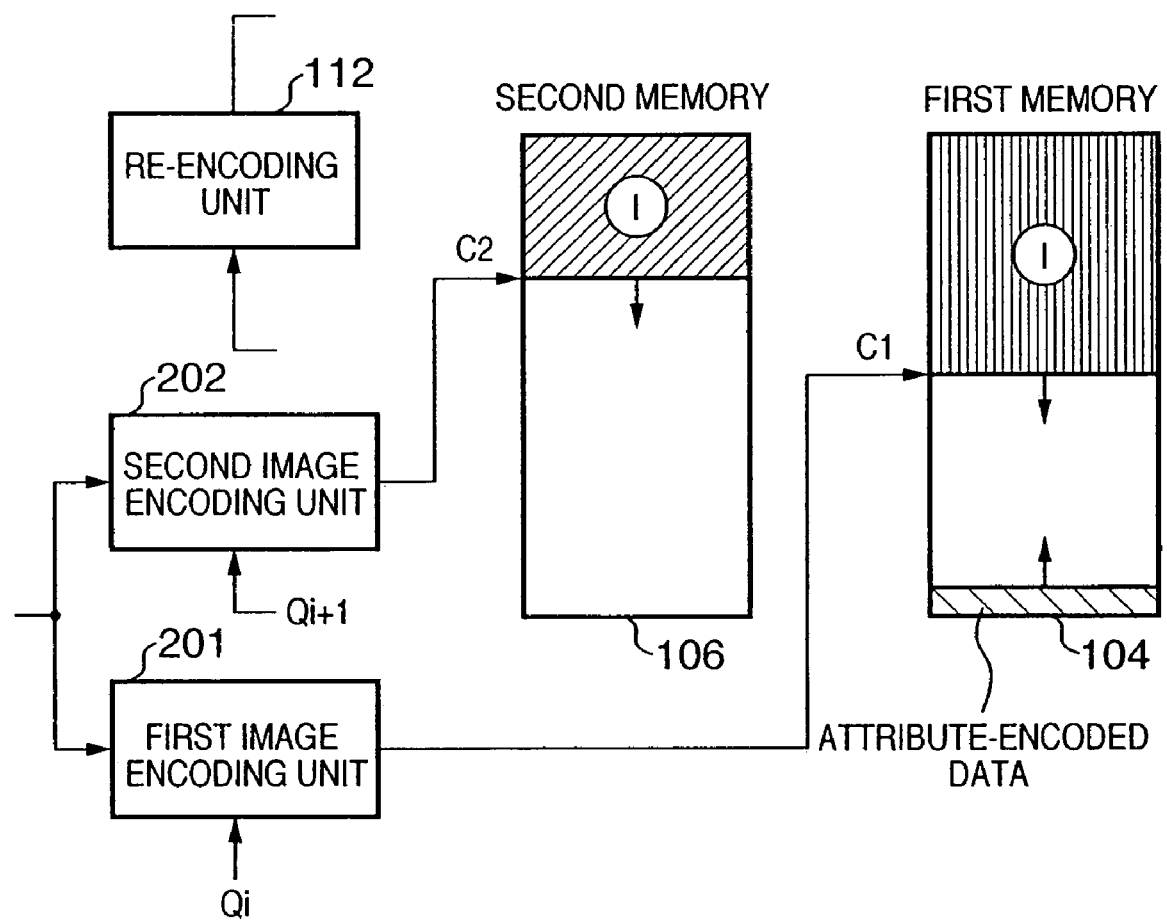
FIG. 14 is a view showing a data flow and memory storage status in the encoding phase according to the second embodiment.

In the encoding phase, steps S801, S303, and S305 are repetitively executed. Although the processes in steps S801 and S305 are the same as those in the case with one encoding unit, as described in the first embodiment, only the encoding process in step S303 differs, as shown in FIG. 14. More specifically, the first and second image encoding units 201 and 202 parallel-execute an image data encoding process, and encoded data of image data with a compression ratio higher than that in the first memory 104 is stored in the second memory 106.

Figure 15:
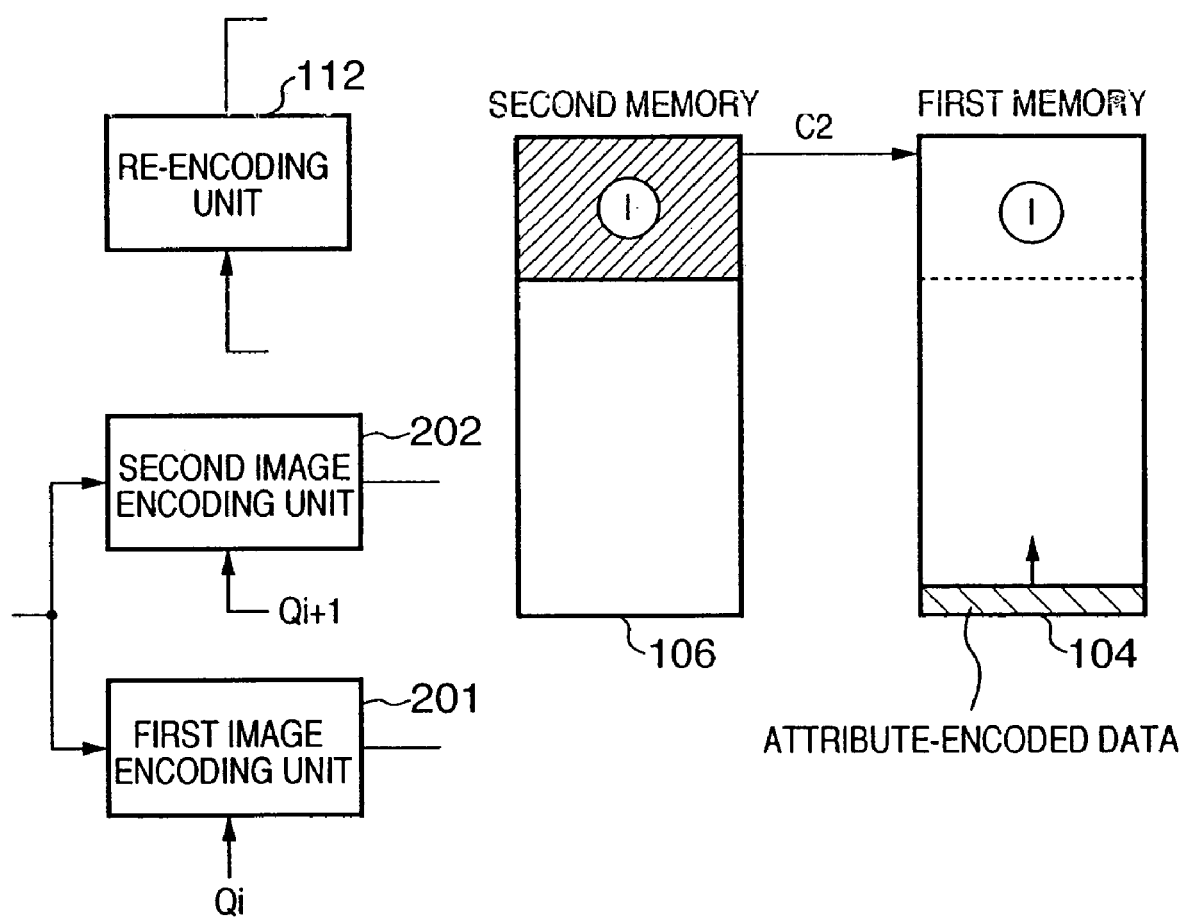
FIG. 15 is a view showing a data flow and memory storage status in the transfer phase according to the second embodiment.

If the total encoded data amount in the first memory 104 exceeds a target value (step S305), encoded data of image data held in the first memory 104 is immediately discarded (step S307), and encoded data with a high compression ratio held in the second memory 106 is transferred to the first memory 104 (step S317: see FIG. 15). This makes it possible to quickly store the second appropriate candidate encoded data, which does not exceed the upper limit, in the first memory 104 without performing the first re-encoding process described in the first embodiment. This is the greatest merit in using not the arrangement shown in FIG. 1 but the arrangement shown in FIG. 2 which has the two encoding units.

The second embodiment is based on the idea that it is useless to have encoded data with the same compression ratio in the two memories 104 and 106, and hence encoded data with a compression ratio higher than that of encoded data stored in the first memory 104 is stored in the second memory 106. The subsequent process is therefore performed on the basis of this idea. Upon the completion of transferring encoded data in the second memory 106 to the first memory 104 (transfer phase), the encoded data in the second memory 106 is re-encoded to hold encoded with a compression ratio further increased by one step.

Figure 16:
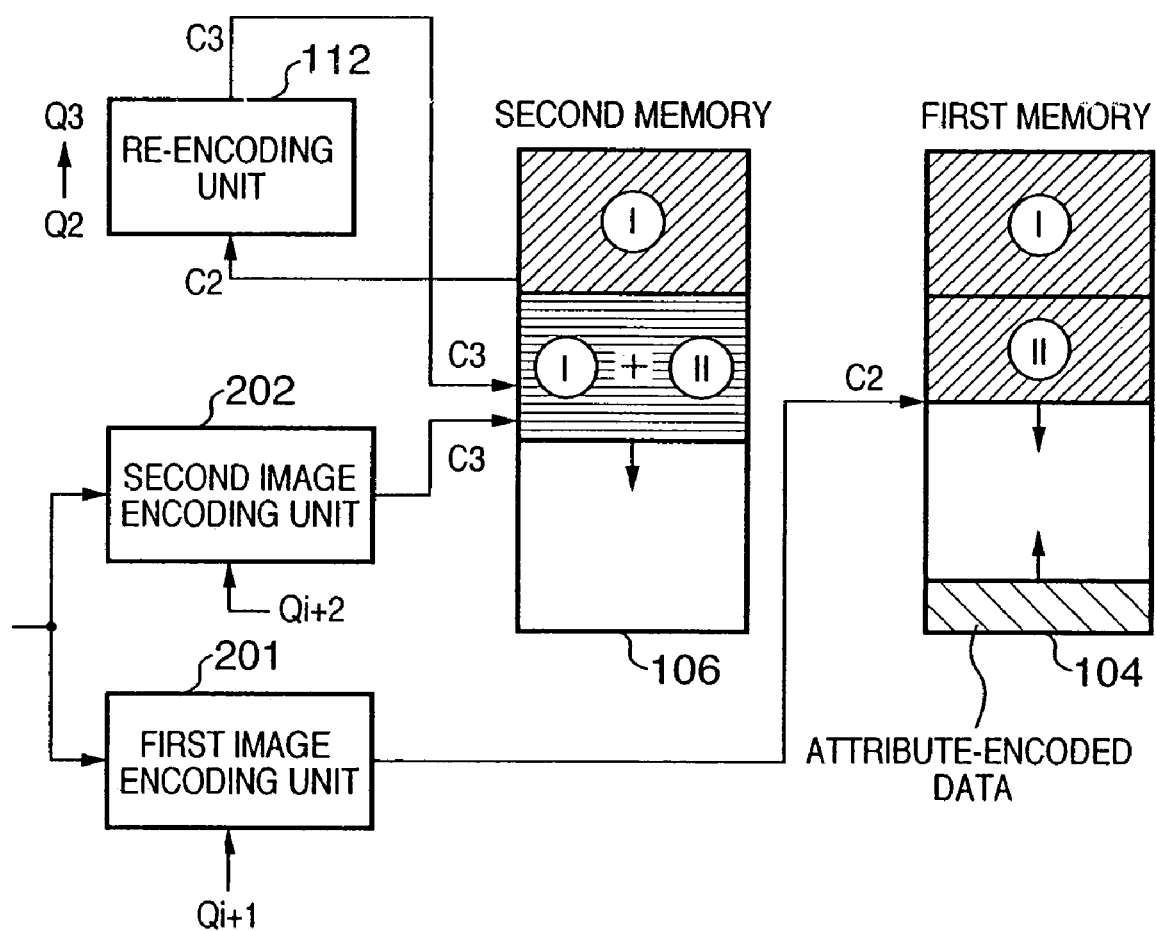
FIG. 16 is a view showing a data flow and memory storage status in the encoding/re-encoding phase according to the second embodiment.

More specifically, as shown in FIG. 16, in the encoding/re-encoding phase after the transfer phase, the quantization matrix tables Qi and Qi+1 set for the first and second image encoding units 201 and 202 prior to re-encoding are changed to Qi+1 and Qi+2, respectively (step S309). If 1-page image data is continuously input without being stopped (step S803), the subsequent image data as input data are encoded by the two encoding units using the new quantization steps (step S311), and the resultant data are respectively stored in the corresponding memories 104 and 106. Concurrently with the encoding process, the encoded data stored in the second memory 106 (the data transferred to the first memory 104) is re-encoded (step S313) by the re-encoding unit 112 using the quantization step Qi+2 so as to change the data into encoded data with a compression ratio higher by one step than that of the encoded data in the first memory 104. The re-encoded data is then stored in the second memory 106. In the second embodiment, as in the first embodiment, in the re-encoding process, each quantized value obtained by temporarily Huffman-decoding encoded data is divided at the ratio of $Qi+1$ and $Qi+2$ (the speed is increased by a combination with a bit shift process), and then the resultant data is Huffman-encoded again. This method allows a high-speed re-encoding process because neither inverse orthogonal transformation nor re-orthogonal transformation is performed.

Note that if there are two image encoding units as in the second embodiment, encoded data from the image encoding unit 202 and re-encoded data from the re-encoding unit 112 may be mixed and stored in the second memory 106, as shown in FIG. 16. As described above, therefore, encoded data must be divided into certain units and managed as files or packets in the second memory 106 as well.

Referring to FIG. 13, if the end of the re-encoding process is detected in step S315, the flow shifts to the encoding phase (steps S801 and S303). Note that in the encoding phase after the encoding/re-encoding phase, encoded data held in the two memories 104 and 106 differ in their compression ratios and in their manners (addresses) in which encoded data are mixed, as shown in FIG. 16. If, therefore, the data amount in the first memory 104 exceeds a set value, encoded data (codes in a horizontal stripe area I+II) held in the second memory 106 needs to be transferred to the first memory 104.

In consideration of them, encoded data must be managed as files or packets in the first memory 104 as well as the second memory 106. Details of the management method are not directly related to features of the present invention, and a description thereof will be omitted.

Figure 17:
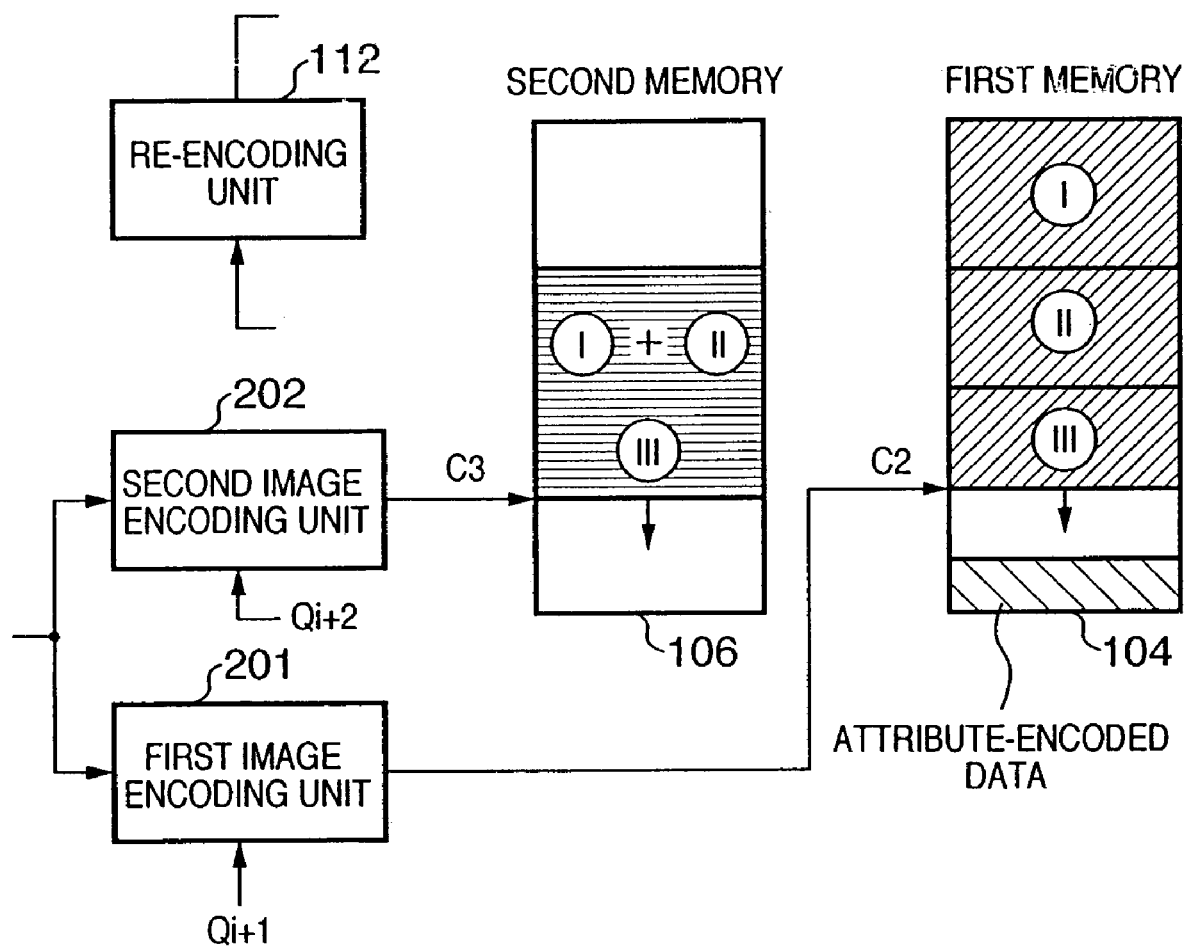
FIG. 17 is a view showing a data flow and memory storage status in the encoding phase after the transfer phase according to the second embodiment.

The state of the encoding phase shown in FIG. 17 is the same as the encoding phase in the initial state (FIG. 14) except that the quantization steps and the manners in which encoded data are mixed differ before and after the re-encoding process. By repeating the encoding phase, transfer phase, and encoding/re-encoding phase, encoded data obtained by compressing 1-page image data to a set upper limit or less can be reliably stored in the first memory 104.

Since the transfer phase and encoding/re-encoding phase are performed in an order reverse to that in the first embodiment, detection of the end of input of 1-page image data (step S805), which is performed after the transfer process in FIG. 8, is done at almost the same timing as detection of the end of input of 1-page image data, which is performed in the encoding/re-encoding phase (step S803). That is, the two detection processes are almost the same as step S805 in terms of function and almost the same as step S803 in terms of timing. These two steps are therefore integrated into a new step of detecting the end of input of 1-page image data, and this step is written as step S1201 in FIG. 13.

The first and second embodiments according to the present invention have been described, and the first and second memories 104 and 106 are described as physically different memories. It is one of features of the present invention to independently arrange two memories. However, the present invention incorporates even a case wherein the first and second memories 104 and 106 are not physically different memories. Assume that two areas corresponding to the first and second memories are ensured in physically one memory when the transfer speed of a memory is high enough. In this case, it is obvious from the above description with the first and second memories being replaced with the first and second memory areas that the present invention can be realized by one memory.

If each embodiment described above is implemented by one memory, some steps in the data transfer process described with reference to the transfer phase become unnecessary. Details of each of such cases can be easily expected, and hence a description thereof will be omitted. When the two areas are strictly separated from each other and used, the data transfer process is required as in the case wherein physically two memories are used. If, however, identical data are shared between the two areas, the data transfer process can be omitted, and the storage capacity can also be reduced.

For example, in transferring encoded data held in the second memory area to the first memory area, two kinds of information on the start address at which the encoded data is stored and the data size of the encoded data are transferred from the second memory control unit to the first memory control unit, thereby obtaining the same effects as transferring the encoded data.

If the encoded data is stored in a file or packet form, the amount of information to be transferred between the memory control units slightly increases, and management table information associated with the encoded data must be transferred.

In the above embodiments, the area flag is formed from two bits representing a character-line image/halftone and a chromatic color/achromatic color. The area flag may also contain information on whether the area is a dot area and information on the thickness of a line image.

In the first and second embodiments, the present invention is applied to the copying machine shown in FIG. 20. It is apparent that the present invention can also be applied to a case wherein an image input apparatus such as an image scanner is connected to a general-purpose information processing apparatus such as a personal computer to encode data. In this case, a program associated with the process shown in FIG. 3 (or FIG. 8) or FIG. 13 suffices to be executed, and the computer program apparently falls within the scope of the present invention. In general, the computer program can be executed by setting a computer-readable storage medium such as a CD-ROM in a computer, and copying or installing the computer program into the system. As a matter of course, the computer-readable storage medium also falls within the scope of the present invention.

As has been described above, according to the present invention, the encoded data amount of an image and its area attribute information can be encoded to a target amount or less by one input operation of image data, and an input image can be efficiently encoded in accordance with the property of the image.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-225816 filed on Aug. 2, 2004, which is hereby incorporated by reference herein.

What is claimed is:

1. An image encoding apparatus which receives image data, and encodes and outputs the image data and area information, comprising:
    input mode setting means for setting whether input image data is a character line image or a halftone image;
    image encoding means for encoding image data in accordance with a first parameter for determining a compression ratio;
    re encoding means for decoding encoded data generated by said image encoding means, and re encoding the decoded data in accordance with a second parameter for determining a compression ratio;

attribute detection means for detecting area attribute information of input image data;

attribute correction means for correcting the area attribute information in accordance with a third parameter;

attribute encoding means for encoding the area attribute information corrected by said attribute correction means;

initial parameter setting means for determining the first parameter and the third parameter in accordance with an input mode set by said input mode setting means, and respectively setting the first parameter and the third parameter for said image encoding means and said correction means;

monitoring means for monitoring a total code amount as a sum of an image encoded data amount generated by said image encoding means and an attribute encoded data amount generated by said attribute encoding means in accordance with the set parameters during input of a 1 page image, and determining whether the total code amount is not less than a predetermined value;

parameter update means for, when said monitoring means determines that the total code amount is not less than the predetermined value, (a) updating the first parameter set for said image encoding means to a new first parameter of a higher compression ratio, and causing said image encoding means to continue encoding of image data, and (b) setting a second parameter equal to the updated new first parameter for said re encoding means, and causing said re encoding means to re encode image encoded data before the total code amount is not less than the predetermined value; and control means for, when said parameter update means updates the parameters, (a) causing said re encoding means to re encode, in accordance with the second parameter, encoded data generated by said image encoding means before the new first parameter is set, and storing the re encoded data as encoded data generated by said image encoding means after the new first parameter is set, and (b) storing the encoded data generated by said image encoding means after the new first parameter is set as succeeding encoded data.

2. The apparatus according to claim 1, wherein when said input mode setting means represents that a character line image is set, said initial parameter setting means sets, as the third parameter, information which instructs said correction means to forcibly rewrite information representing a character line image/halftone in the area information detected by said attribute detection means into information representing a character line image, and when said input mode setting means represents that a halftone image is set, said initial parameter setting means sets, as the third parameter, information which instructs said correction means to forcibly rewrite information representing a character line image/halftone in the area information detected by said attribute detection means into information representing a halftone.

3. The apparatus according to claim 1, wherein the mode set by said input mode setting means includes an auto mode, and when the auto mode is set, said initial parameter setting means sets, as the third parameter, information which instructs said correction means to pass the area information detected by said attribute detection means without correcting the area information.

4. An image encoding method of receiving image data, and encoding and outputting the image data and area information, comprising:

an input mode setting step of setting whether input image data is a character line image or a halftone image;

an image encoding step of encoding image data in accordance with a first parameter for determining a compression ratio;

a re encoding step of decoding encoded data generated in the image encoding step, and re encoding the decoded data in accordance with a second parameter for determining a compression ratio;

an attribute detection step of detecting area attribute information of input image data;

an attribute correction step of correcting the area attribute information in accordance with a third parameter;

an attribute encoding step of encoding the area attribute information corrected in the attribute correction step;

an initial parameter setting step of determining the first parameter and the third parameter in accordance with an input mode set in the input mode setting step, and respectively setting the first parameter and the third parameter for the image encoding step and the correction step;

a monitoring step of monitoring a total code amount as a sum of an image encoded data amount generated in the image encoding step and an attribute encoded data amount generated in the attribute encoding step in accordance with the set parameters during input of a 1 page image, and determining whether the total code amount is not less than a predetermined value;

a parameter update step of, when the total code amount is determined in the monitoring step to be not less than the predetermined value, (a) updating the first parameter set for the image encoding step to a new first parameter of a higher compression ratio, and continuing encoding of image data, and (b) setting a second parameter equal to the updated new first parameter for the re encoding step, and re encoding image encoded data before the total code amount is not less than the predetermined value; and a control step of, when the parameters are updated in the parameter update step, (a) re encoding, in the re encoding step in accordance with the second parameter, encoded data generated in the image encoding step before the new first parameter is set, and storing the re encoded data as encoded data generated in the image encoding step after the new first parameter is set, and (b) storing the encoded data generated in the image encoding step after the new first parameter is set as succeeding encoded data.

5. A computer readable storage medium having stored thereon a computer program which when executed by a computer causes the computer to function as:

input mode setting means for setting whether input image data is a character line image or a halftone image;

image encoding means for encoding image data in accordance with a first parameter for determining a compression ratio;

re encoding means for decoding encoded data generated by said image encoding means, and re encoding the decoded data in accordance with a second parameter for determining a compression ratio;

attribute detection means for detecting area attribute information of input image data;

attribute correction means for correcting the area attribute information in accordance with a third parameter;

attribute encoding means for encoding the area attribute information corrected by said attribute correction means;

initial parameter setting means for determining the first parameter and the third parameter in accordance with an input mode set by said input mode setting means, and respectively setting the first parameter and the third parameter for said image encoding means and said correction means;

monitoring means for monitoring a total code amount as a sum of an image encoded data amount generated by said image encoding means and an attribute encoded data amount generated by said attribute encoding means in accordance with the set parameters during input of a 1 page image, and determining whether the total code amount is not less than a predetermined value;

parameter update means for, when said monitoring means determines that the total code amount is not less than the predetermined value, (a) updating the first parameter set for said image encoding means to a new first parameter of a higher compression ratio, and causing said image encoding means to continue encoding of image data, and (b) setting a second parameter equal to the updated new first parameter for said re encoding means, and causing said re encoding means to re encode image encoded data before the total code amount is not less than the predetermined value; and control means for, when said parameter update means updates the parameters, (a) causing said re encoding means to re encode, in accordance with the second parameter, encoded data generated by said image encoding means before the new first parameter is set, and storing the re encoded data as encoded data generated by said image encoding means after the new first parameter is set, and (b) storing the encoded data generated by said image encoding means after the new first parameter is set as succeeding encoded data.

6. An image encoding apparatus which receives image data, and encodes and outputs the image data and area information, comprising:

input mode setting means for setting whether input image data is a character line image or a halftone image;

first image encoding means for encoding input image data in accordance with a first parameter for determining a compression ratio;

second image encoding means for encoding the input image data in parallel with said first image encoding means in accordance with a second parameter higher in compression ratio than the first parameter;

re encoding means for decoding image encoded data generated by said second image encoding means, and re encoding the decoded data in accordance with a third parameter for determining a compression ratio;

attribute detection means for detecting area attribute information of input image data;

attribute correction means for correcting the area attribute information in accordance with a fourth parameter;

attribute encoding means for encoding the area attribute information corrected by said attribute correction means;

initial parameter setting means for determining the first parameter, the second parameter, and the fourth parameter in accordance with an input mode set by said input mode setting means, and respectively setting the first parameter, the second parameter, and the fourth parameter for said first image encoding means, said second image encoding means, and said correction means;

monitoring means for monitoring a total code amount as a sum of an image encoded data amount generated by said first image encoding means and an attribute encoded data amount generated by said attribute encoding means in accordance with the set parameters during input of a 1 page image, and determining whether the total code amount is not less than a predetermined value;

parameter update means for, when said monitoring means determines that the total code amount is not less than the predetermined value, (a) updating the first parameter set for said first image encoding means to a new first parameter equal to the second parameter, updating the second parameter set for said second image encoding means to a new second parameter of a higher compression ratio, and causing said first image encoding means and said second image encoding means to continue encoding, and (b) setting the updated new second parameter as the third parameter for said re encoding means; and control means for, when said parameter update means updates the parameters, (a) storing encoded data generated by said second image encoding means before the new second parameter is set as encoded data by said first image encoding means before the new first parameter is set, (b) causing said re encoding means to re encode, in accordance with the third parameter, encoded data generated by said second image encoding means before the new second parameter is set, and storing the re encoded data as encoded data generated by said second image encoding means after the new second parameter is set, and (c) storing the encoded data generated by said first image encoding means after the new first parameter is set as succeeding encoded data.

7. The apparatus according to claim 6, wherein when said input mode setting means represents that a character line image is set, said initial parameter setting means sets, as the fourth parameter, information which instructs said correction means to forcibly rewrite information representing a character line image/halftone in the area information detected by said attribute detection means into information representing a character line image, and when said input mode setting means represents that a halftone image is set, said initial parameter setting means sets, as the fourth parameter, information which instructs said correction means to forcibly rewrite information representing a character line image/halftone in the area information detected by said attribute detection means into information representing a halftone.

8. The apparatus according to claim 6, wherein the mode set by said input mode setting means includes an auto mode, and when the auto mode is set, said initial parameter setting means sets, as the fourth parameter, information which instructs said correction means to pass the area information detected by said attribute detection means without correcting the area information.

9. An image encoding method of receiving image data, and encoding and outputting the image data and area information, comprising:

an input mode setting step of setting whether input image data is a character line image or a halftone image;

a first image encoding step of encoding input image data in accordance with a first parameter for determining a compression ratio;

a second image encoding step of encoding the input image data in parallel with the first image encoding step in accordance with a second parameter higher in compression ratio than the first parameter;

a re encoding step of decoding image encoded data generated in the second image encoding step, and re encoding the decoded data in accordance with a third parameter for determining a compression ratio;

an attribute detection step of detecting area attribute information of input image data;

an attribute correction step of correcting the area attribute information in accordance with a fourth parameter;

an attribute encoding step of encoding the area attribute information corrected in the attribute correction step;

an initial parameter setting step of determining the first parameter, the second parameter, and the fourth parameter in accordance with an input mode set in the input mode setting step, and respectively setting the first parameter, the second parameter, and the fourth parameter for the first image encoding step, the second image encoding step, and the correction step;

a monitoring step of monitoring a total code amount as a sum of an image encoded data amount generated in the first image encoding step and an attribute encoded data amount generated in the attribute encoding step in accordance with the set parameters during input of a 1 page image, and determining whether the total code amount is not less than a predetermined value;

a parameter update step of, when the total code amount is determined in the monitoring step to be not less than the predetermined value, (a) updating the first parameter set for the first image encoding step to a new first parameter equal to the second parameter, updating the second parameter set for the second image encoding step to a new second parameter of a higher compression ratio, and continuing encoding in the first image encoding step and the second image encoding step, and (b) setting the updated new second parameter as the third parameter for the re encoding step; and a control step of, when the parameters are updated in the parameter update step, (a) storing encoded data generated in the second image encoding step before the new second parameter is set as encoded data in the first image encoding step before the new first parameter is set, (b) re encoding, in the re encoding step in accordance with the third parameter, encoded data generated in the second image encoding step before the new second parameter is set, and storing the re encoded data as encoded data generated in the second image encoding step after the new second parameter is set, and (c) storing the encoded data generated in the first image encoding step after the new first parameter is set as succeeding encoded data.

10. A computer readable storage medium having stored thereon a computer program which when executed by a computer causes the computer to function as:

input mode setting means for setting whether input image data is a character line image or a halftone image;

first image encoding means for encoding input image data in accordance with a first parameter for determining a compression ratio;

second image encoding means for encoding the input image data in parallel with said first image encoding means in accordance with a second parameter higher in compression ratio than the first parameter;

re encoding means for decoding image encoded data generated by said second image encoding means, and re encoding the decoded data in accordance with a third parameter for determining a compression ratio;

attribute detection means for detecting area attribute information of input image data;

attribute correction means for correcting the area attribute information in accordance with a fourth parameter;

attribute encoding means for encoding the area attribute information corrected by said attribute correction means;

initial parameter setting means for determining the first parameter, the second parameter, and the fourth parameter in accordance with an input mode set by said input mode setting means, and respectively setting the first parameter, the second parameter, and the fourth parameter for said first image encoding means, said second image encoding means, and said correction means;

monitoring means for monitoring a total code amount as a sum of an image encoded data amount generated by said first image encoding means and an attribute encoded data amount generated by said attribute encoding means in accordance with the set parameters during input of a 1 page image, and determining whether the total code amount is not less than a predetermined value;

parameter update means for, when said monitoring means determines that the total code amount is not less than the predetermined value, (a) updating the first parameter set for said first image encoding means to a new first parameter equal to the second parameter, updating the second parameter set for said second image encoding means to a new second parameter of a higher compression ratio, and causing said first image encoding means and said second image encoding means to continue encoding, and (b) setting the updated new second parameter as the third parameter for said re encoding means; and control means for, when said parameter update means updates the parameters, (a) storing encoded data generated by said second image encoding means before the new second parameter is set as encoded data by said first image encoding means before the new first parameter is set, (b) causing said re encoding means to re encode, in accordance with the third parameter, encoded data generated by said second image encoding means before the new second parameter is set, and storing the re encoded data as encoded data generated by said second image encoding means after the new second parameter is set, and (c) storing the encoded data generated by said first image encoding means after the new first parameter is set as succeeding encoded data.

11. An image forming apparatus which receives a document image and forms a visible image on a predetermined printing medium, comprising:

an image encoding apparatus defined in claim 1 which encodes an input document image and area information obtained from the document image;

storage means for storing encoded data generated by said image encoding apparatus;

decoding means for decoding the encoded data stored in said storage means; and image forming means for forming an image by correcting image data obtained by said decoding means on the basis of the area information.

12. An image forming apparatus which receives a document image and forms a visible image on a predetermined printing medium, comprising:
- an image encoding apparatus defined in claim 6 which encodes an input document image and area information obtained from the document image;
- storage means for storing encoded data generated by said image encoding apparatus;
- decoding means for decoding the encoded data stored in said storage means; and
- image forming means for forming an image by correcting image data obtained by said decoding means on the basis of the area information.

* * * * *